Figure 1:
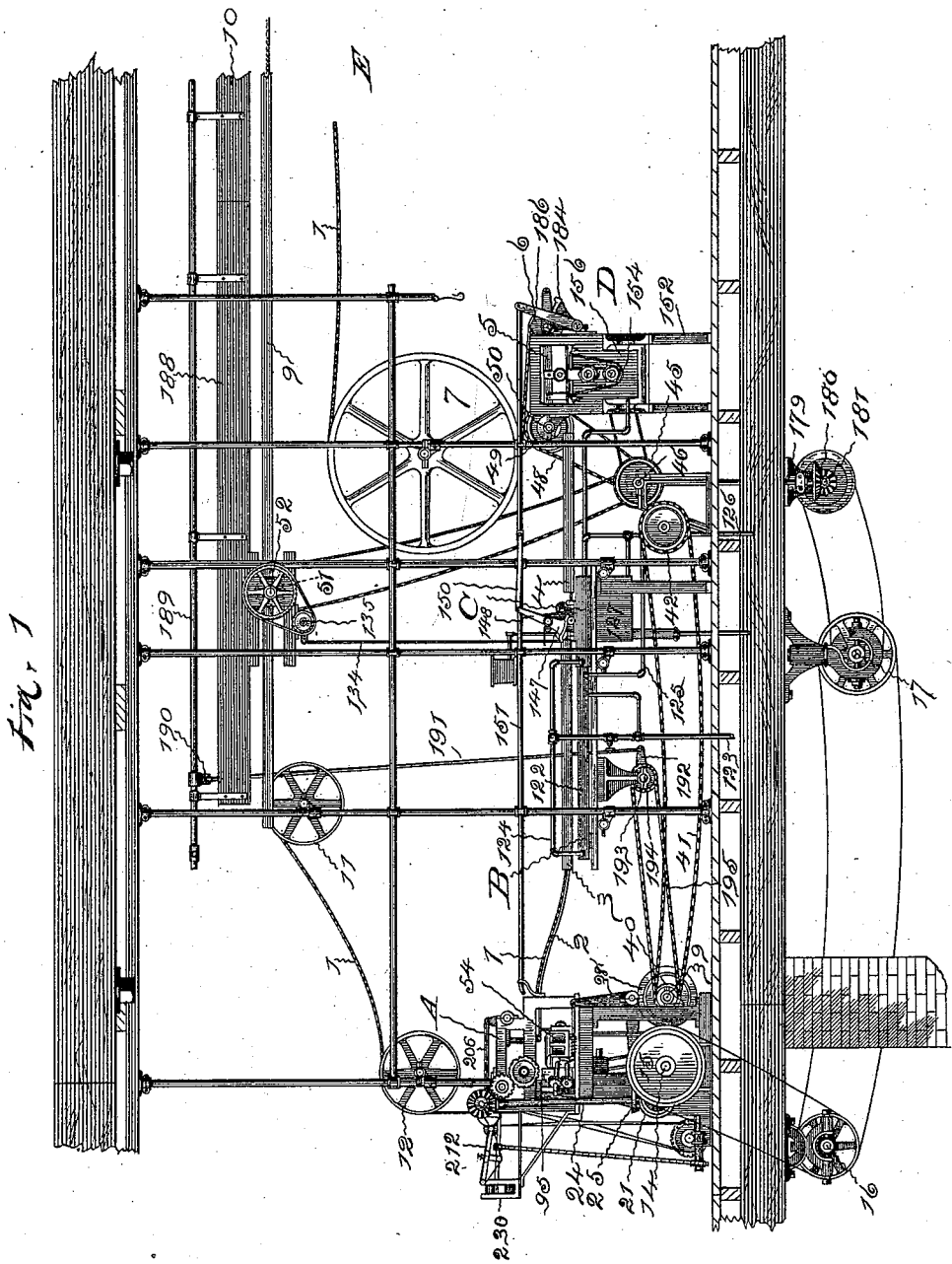

(No Model.) 22 Sheets—Sheet 1.

E. B. BEECHER & J. P. WRIGHT.
MACHINE FOR MAKING MATCHES.

No. 528,457. Patented Oct. 30, 1894.

(No Model.) 22 Sheets—Sheet 3.

E. B. BEECHER & J. P. WRIGHT.
MACHINE FOR MAKING MATCHES.

No. 528,457. Patented Oct. 30, 1894.

Witnesses.
C. E. Buckland.
H. H. Williams

Inventors
E. B. Beecher & J. P. Wright
by H. R. Williams
atty.

(No Model.) 22 Sheets—Sheet 6.

E. B. BEECHER & J. P. WRIGHT.
MACHINE FOR MAKING MATCHES.

No. 528,457. Patented Oct. 30, 1894.

Witnesses: Inventors:

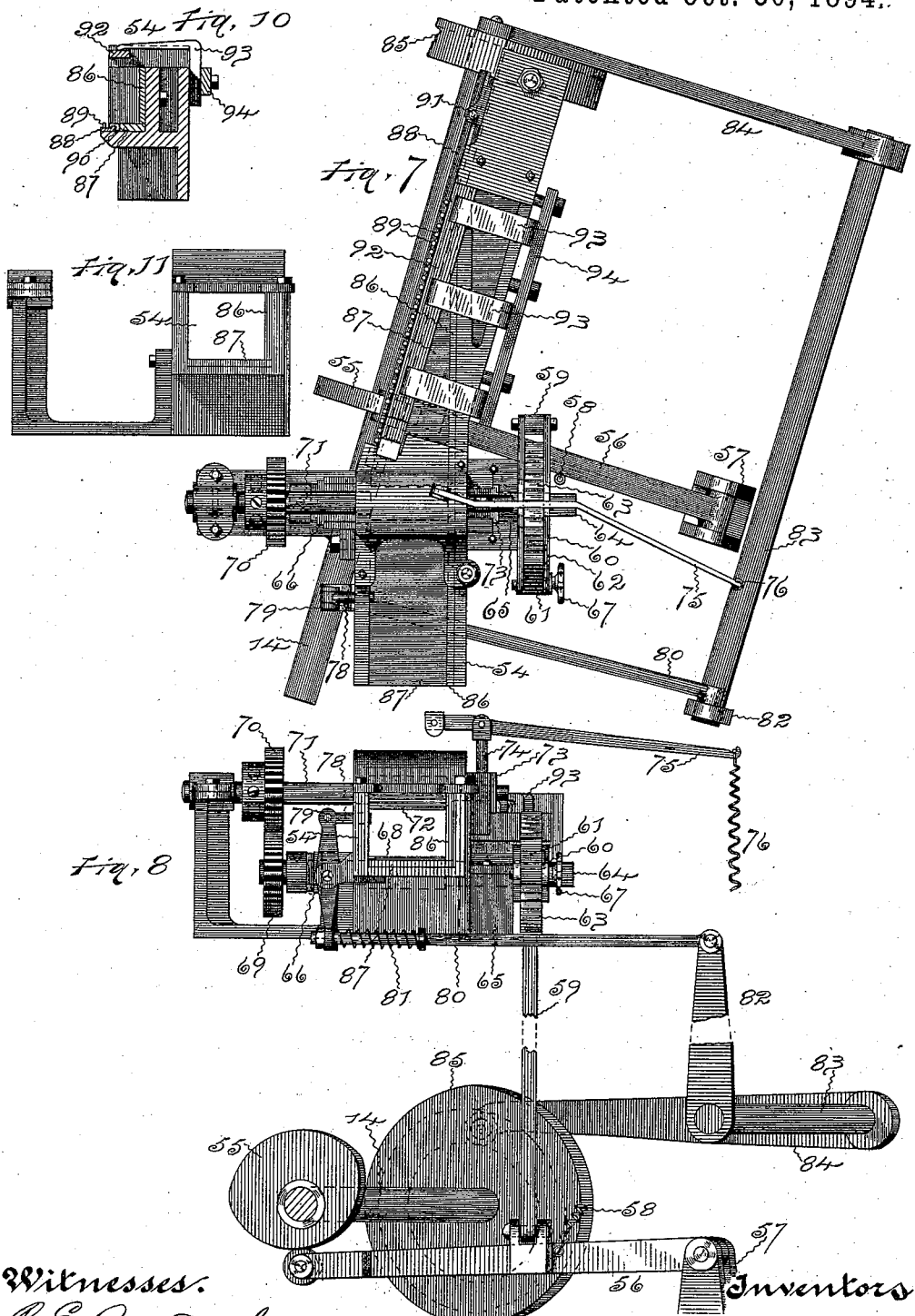

(No Model.)  22 Sheets—Sheet 8.
E. B. BEECHER & J. P. WRIGHT.
MACHINE FOR MAKING MATCHES.
No. 528,457.  Patented Oct. 30, 1894.
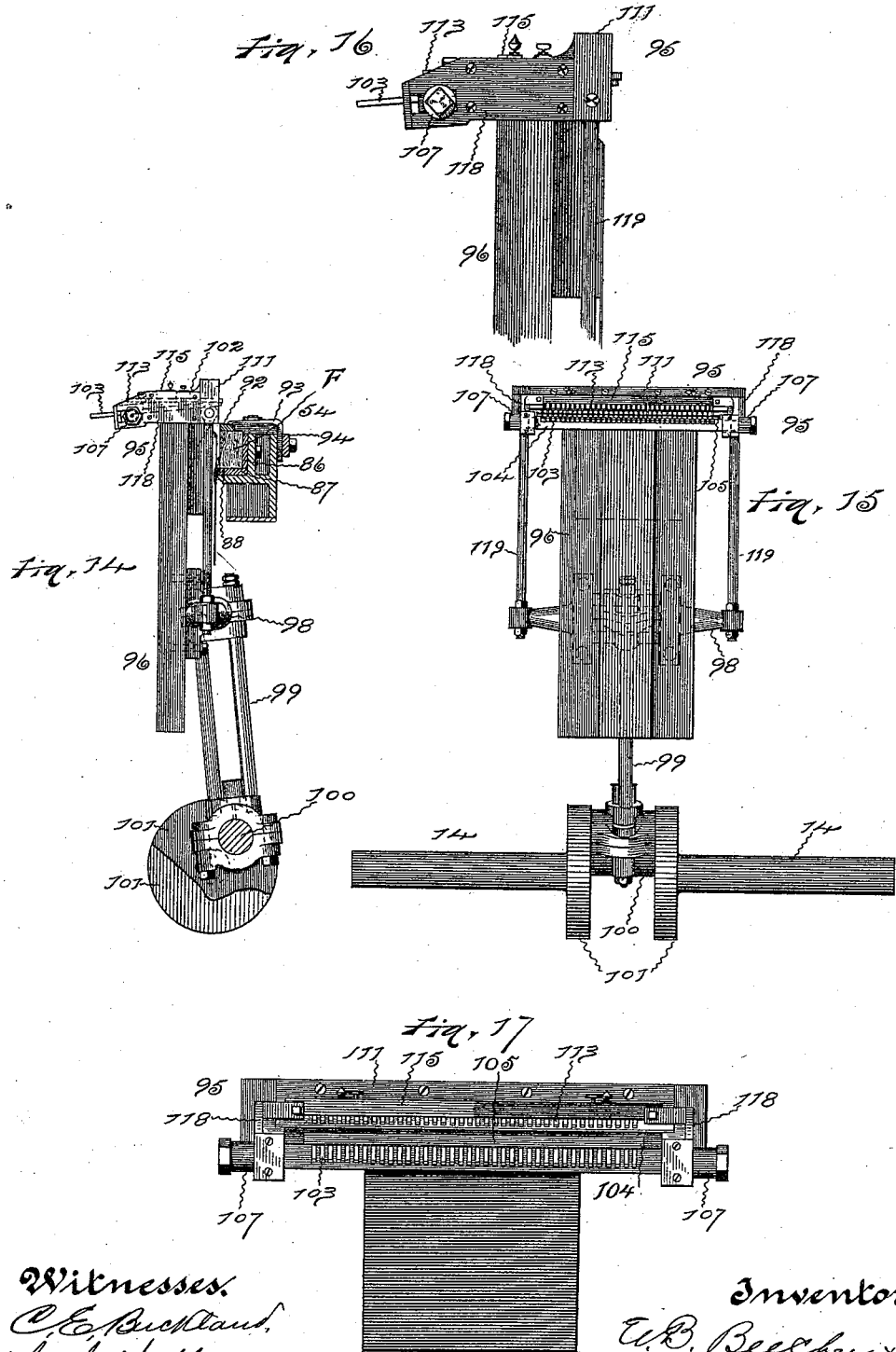

(No Model.)
22 Sheets—Sheet 9.
E. B. BEECHER & J. P. WRIGHT.
MACHINE FOR MAKING MATCHES.
No. 528,457.
Patented Oct. 30, 1894.
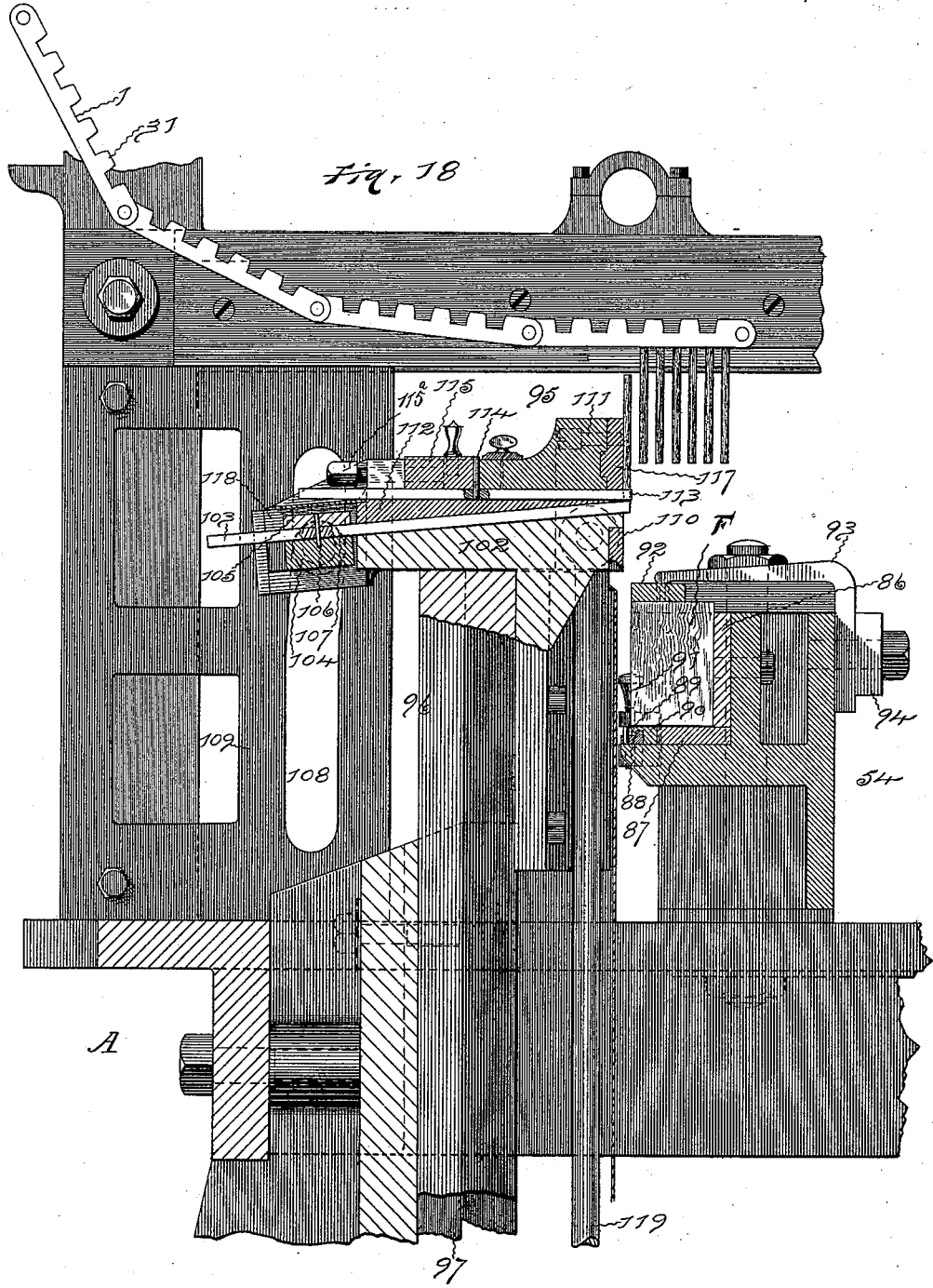

(No Model.) 22 Sheets—Sheet 10.
E. B. BEECHER & J. P. WRIGHT.
MACHINE FOR MAKING MATCHES.
No. 528,457. Patented Oct. 30, 1894.
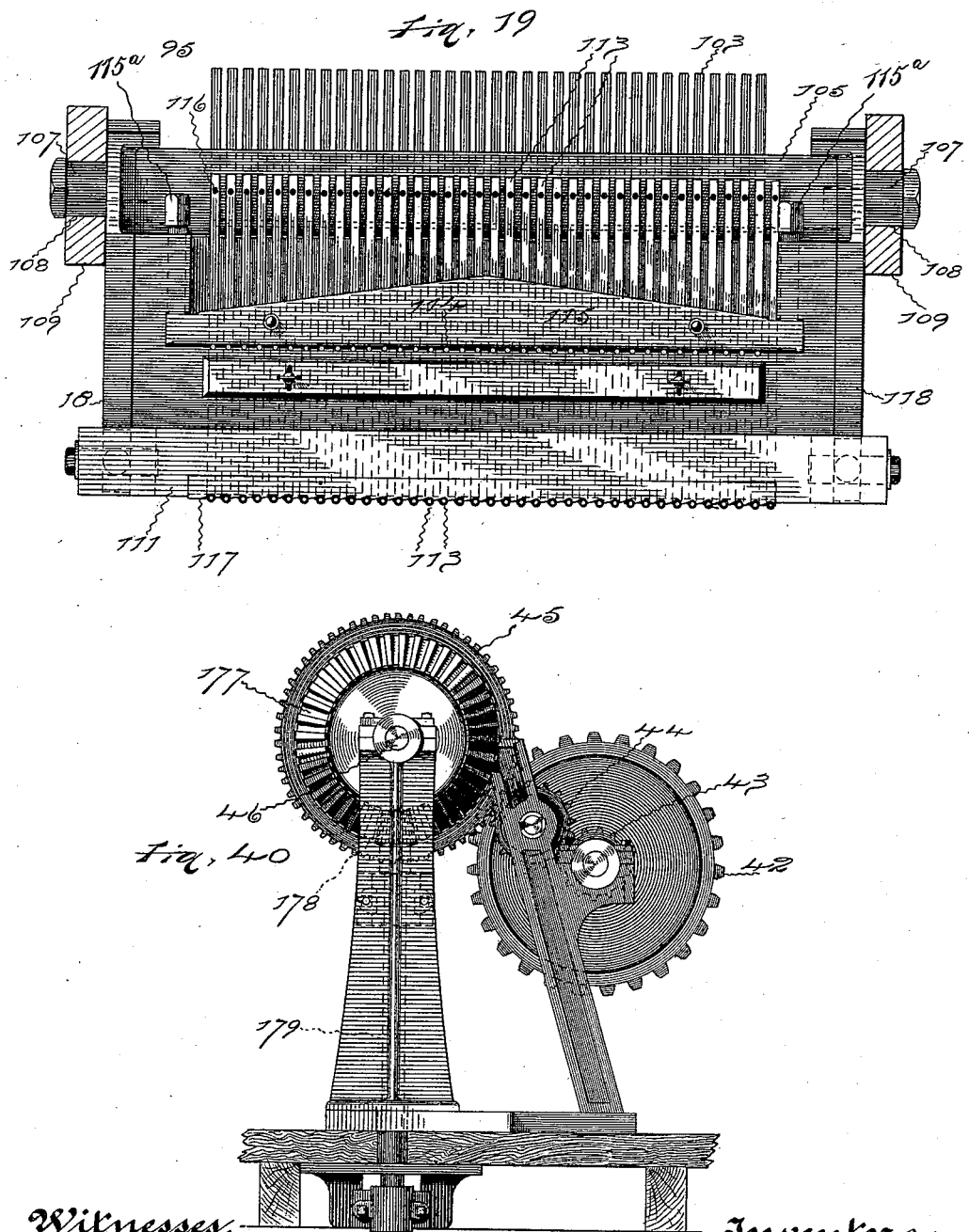
Witnesses. Inventors:

(No Model.) 22 Sheets—Sheet 11.
E. B. BEECHER & J. P. WRIGHT.
MACHINE FOR MAKING MATCHES.
No. 528,457. Patented Oct. 30, 1894.
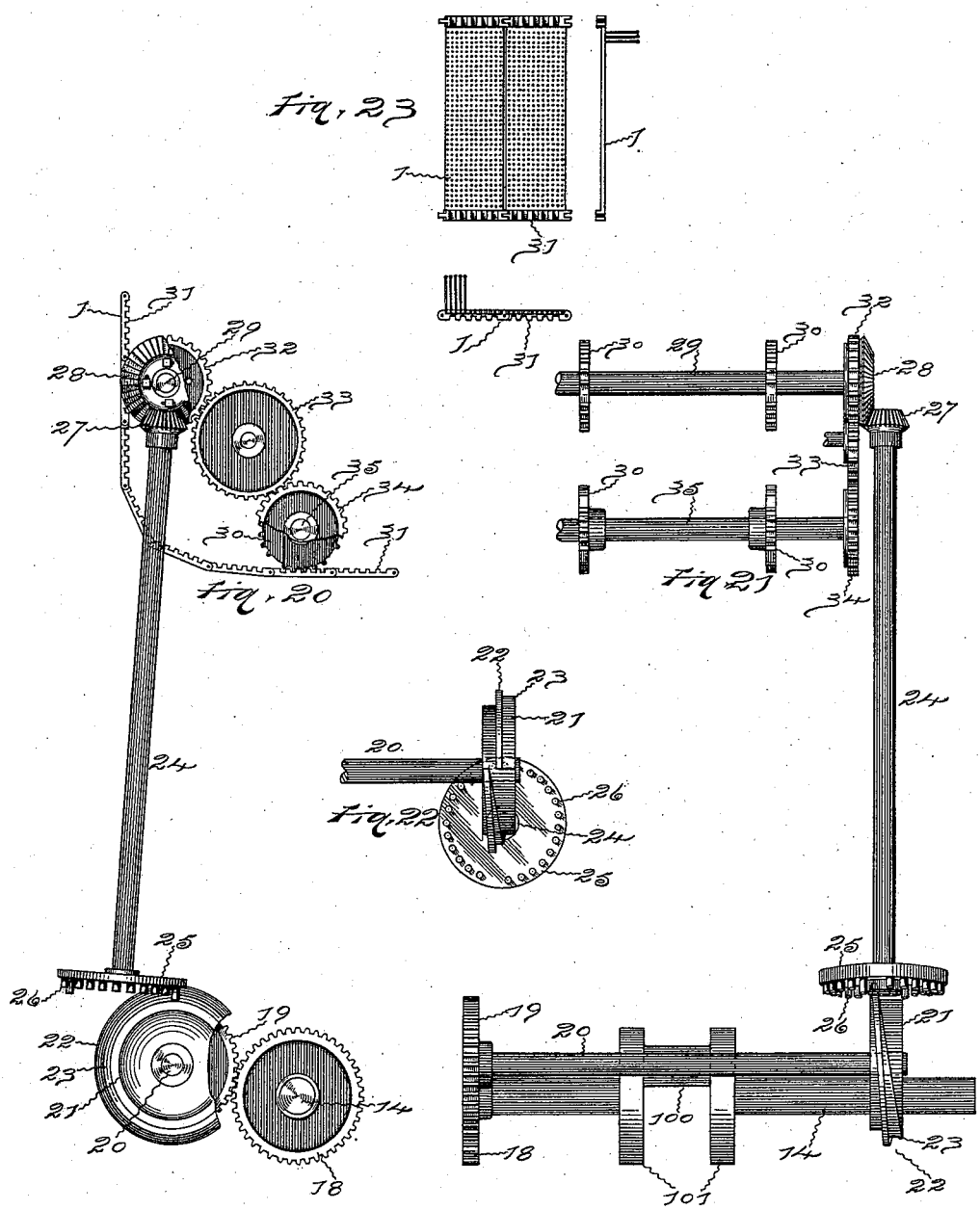

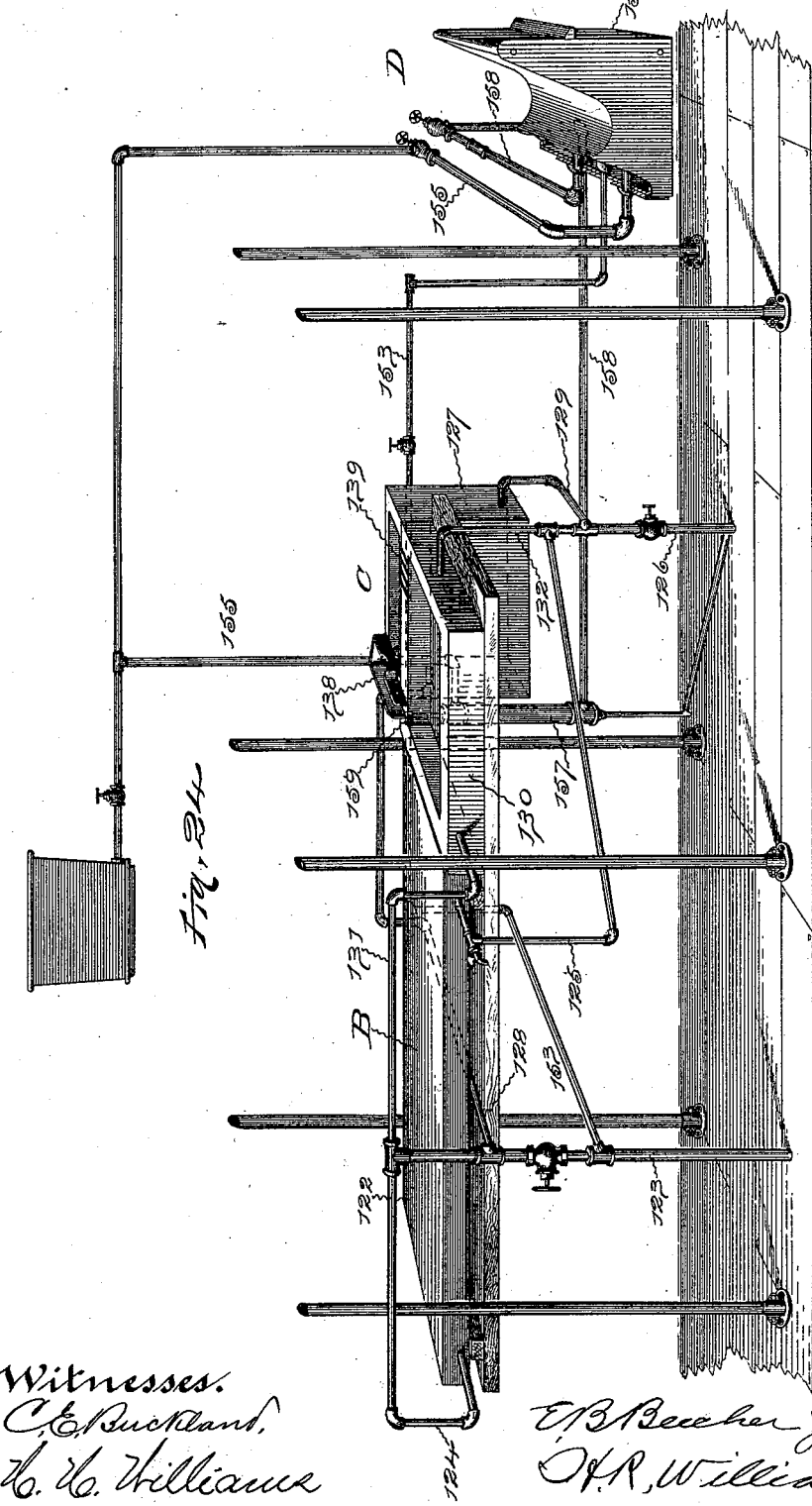

(No Model.) 22 Sheets—Sheet 13.
E. B. BEECHER & J. P. WRIGHT.
MACHINE FOR MAKING MATCHES.
No. 528,457. Patented Oct. 30, 1894.
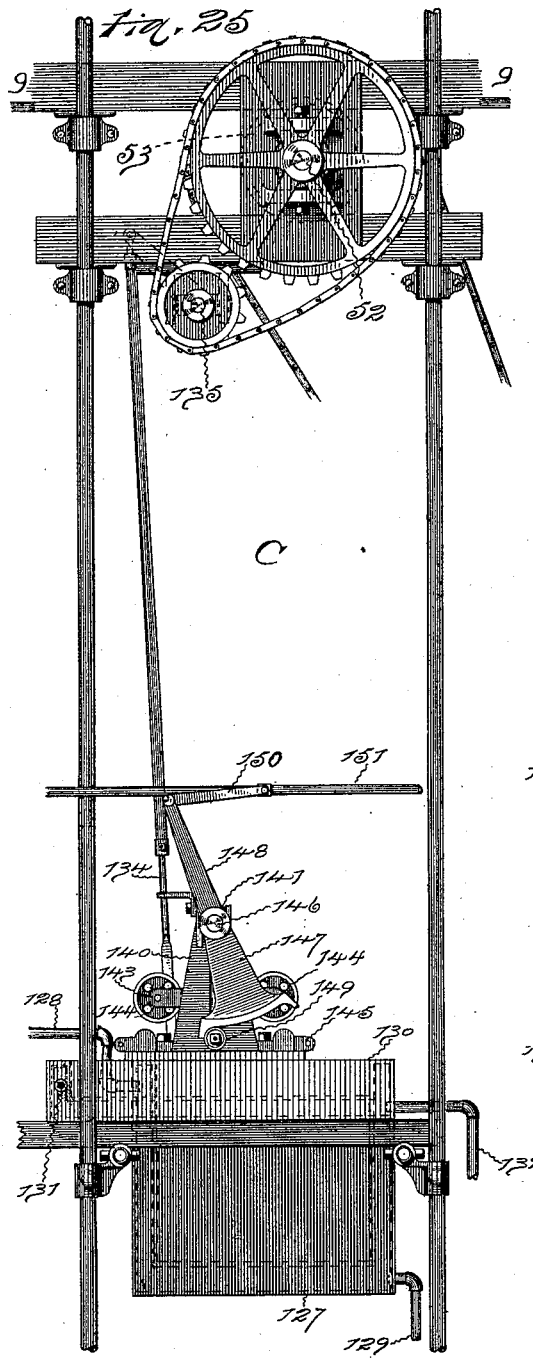
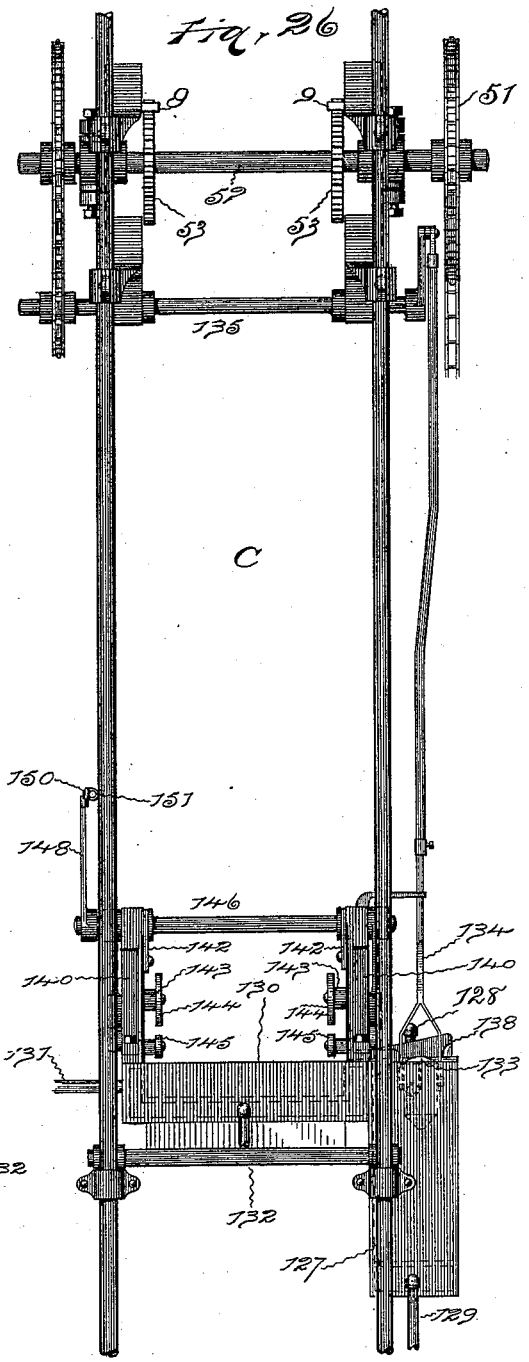

(No Model.) 22 Sheets—Sheet 14.
E. B. BEECHER & J. P. WRIGHT.
MACHINE FOR MAKING MATCHES.
No. 528,457. Patented Oct. 30, 1894.
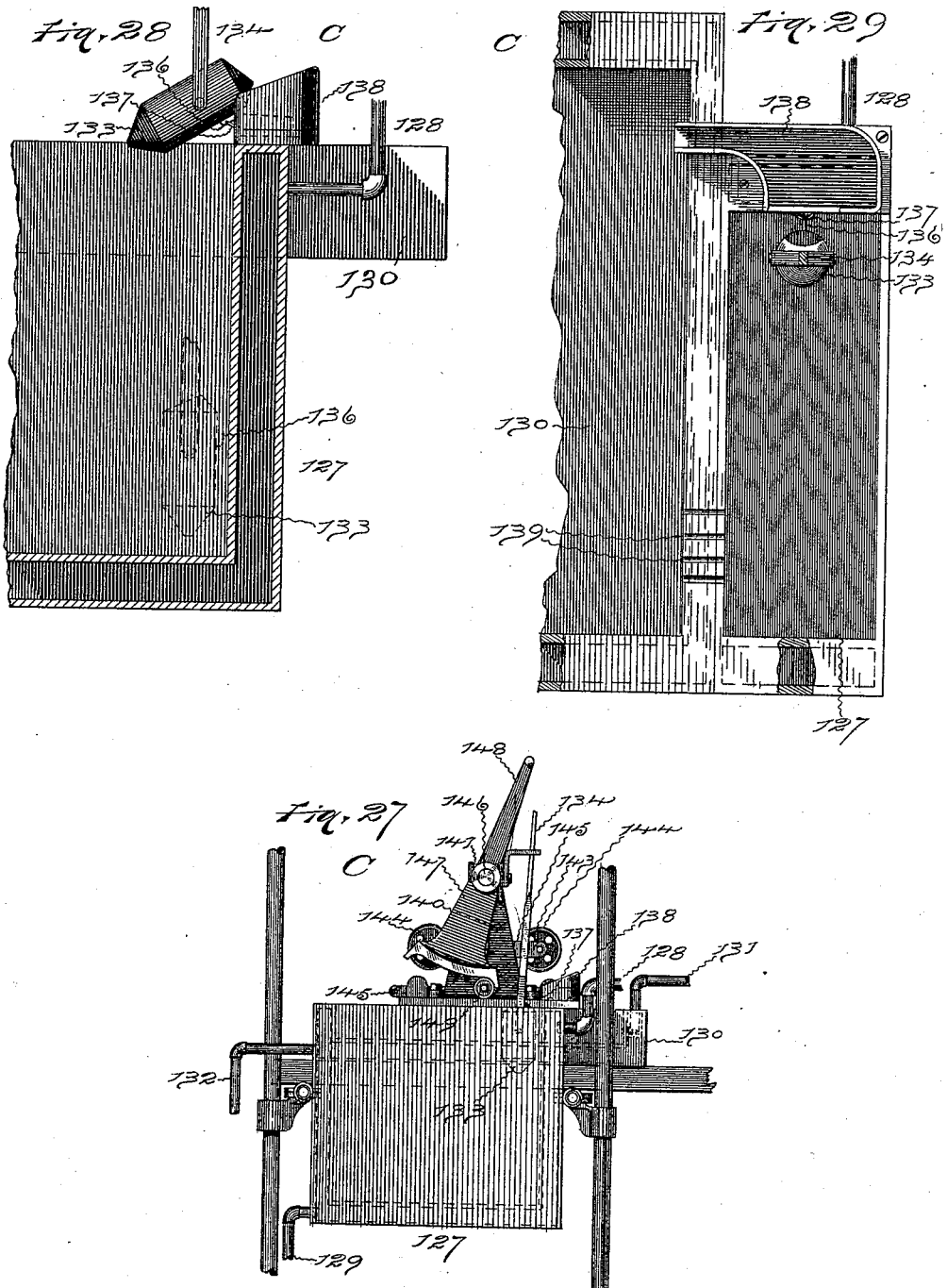
Witnesses.
C. E. Buckland
H. C. Williams
Inventors:
E. B. Beecher & J. P. Wright
by H. R. Williams
Atty.

(No Model.) 22 Sheets—Sheet 15.
E. B. BEECHER & J. P. WRIGHT.
MACHINE FOR MAKING MATCHES.

No. 528,457. Patented Oct. 30, 1894.

Witnesses:
C. E. Buckland,
U. H. Williams

Inventors:
E. B. Beecher & J. P. Wright, by
H. P. Williams, atty.

(No Model.) 22 Sheets—Sheet 16.

E. B. BEECHER & J. P. WRIGHT.
MACHINE FOR MAKING MATCHES.

No. 528,457. Patented Oct. 30, 1894.

(No Model.) 22 Sheets—Sheet 17.
E. B. BEECHER & J. P. WRIGHT.
MACHINE FOR MAKING MATCHES.
No. 528,457. Patented Oct. 30, 1894.
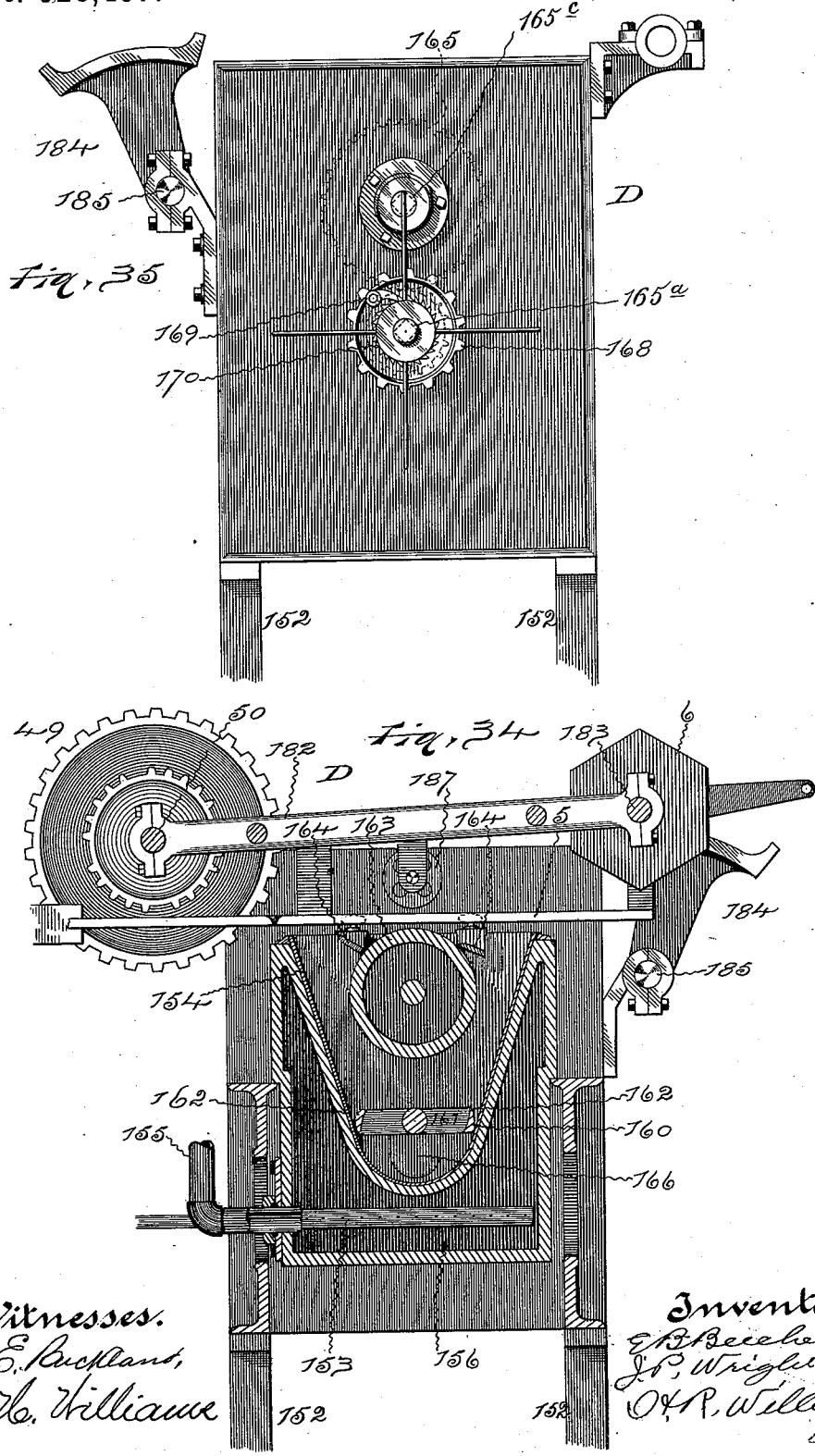

(No Model.) 22 Sheets—Sheet 18.
E. B. BEECHER & J. P. WRIGHT
MACHINE FOR MAKING MATCHES.
No. 528,457. Patented Oct. 30, 1894.
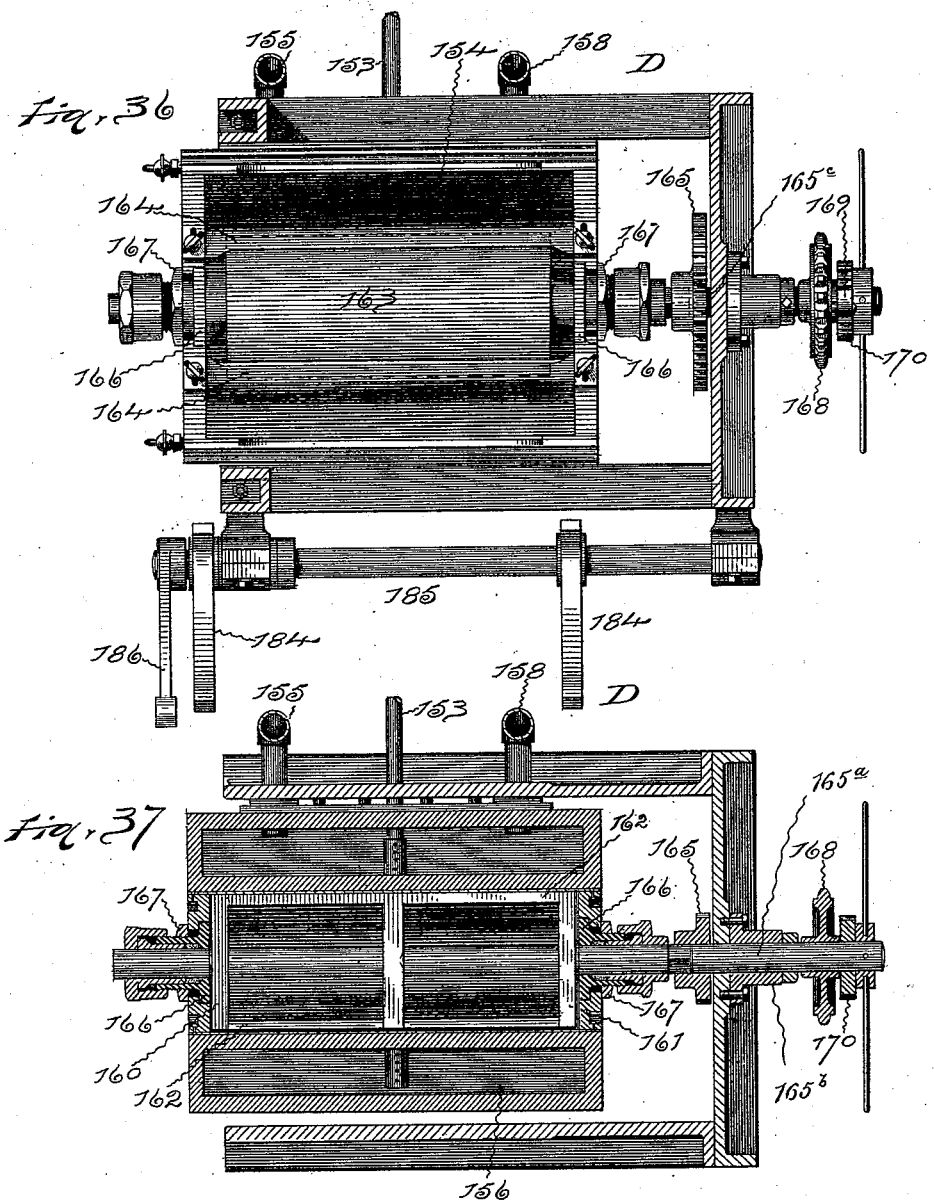

(No Model.) 22 Sheets—Sheet 19.
E. B. BEECHER & J. P. WRIGHT.
MACHINE FOR MAKING MATCHES.
No. 528,457. Patented Oct. 30, 1894.
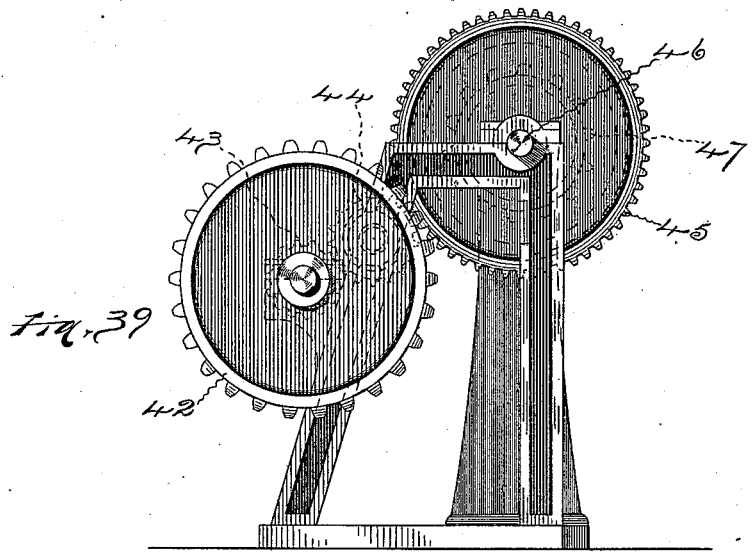
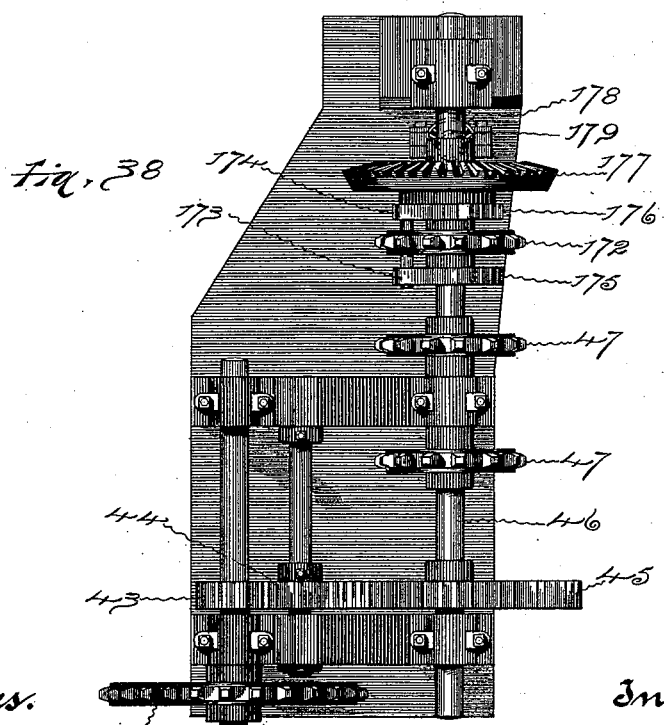

(No Model.) 22 Sheets—Sheet 20.
E. B. BEECHER & J. P. WRIGHT.
MACHINE FOR MAKING MATCHES.
No. 528,457. Patented Oct. 30, 1894.
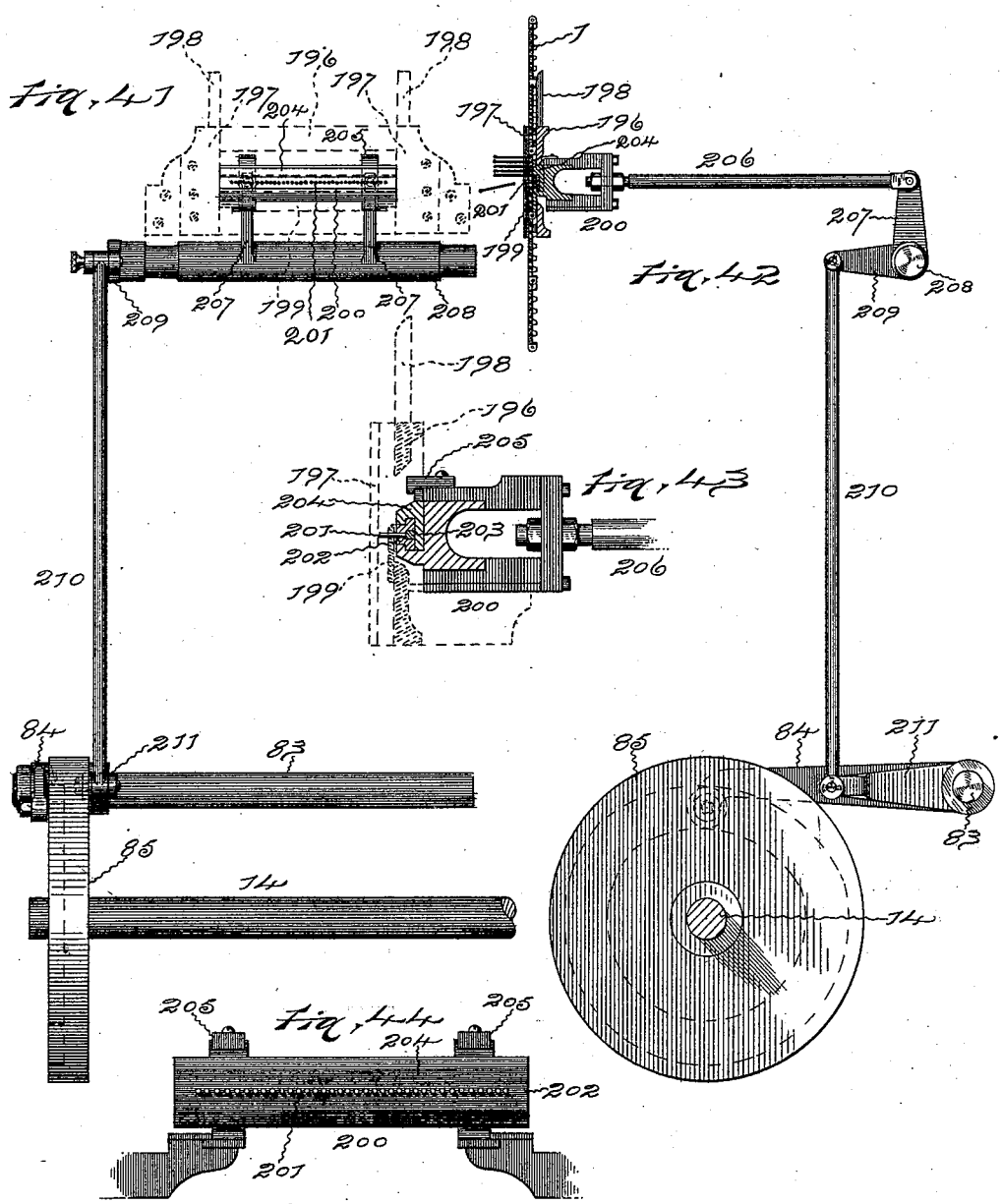
Witnesses.
Inventors.

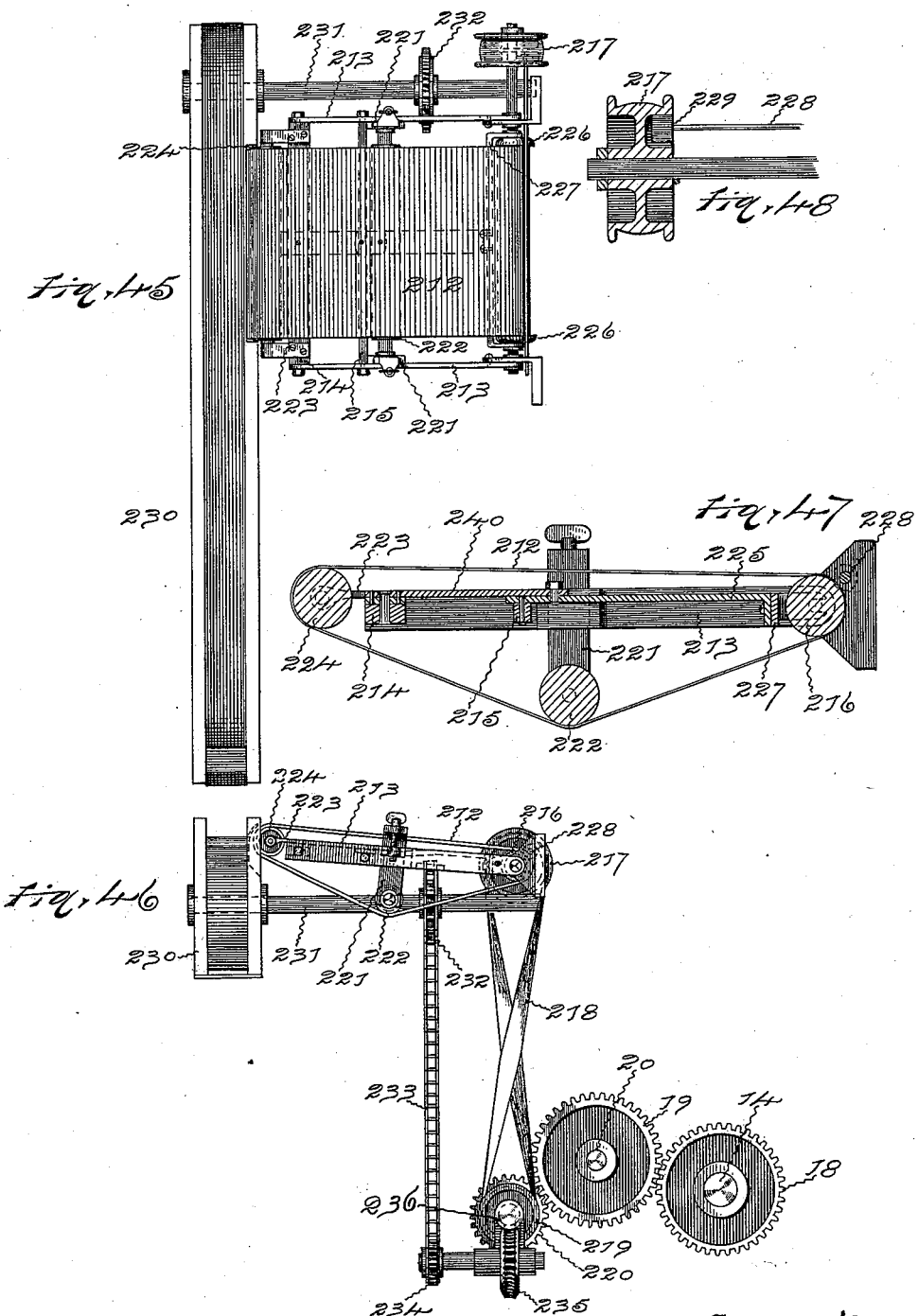

(No Model.) 22 Sheets—Sheet 22.
E. B. BEECHER & J. P. WRIGHT.
MACHINE FOR MAKING MATCHES.
No. 528,457. Patented Oct. 30, 1894.
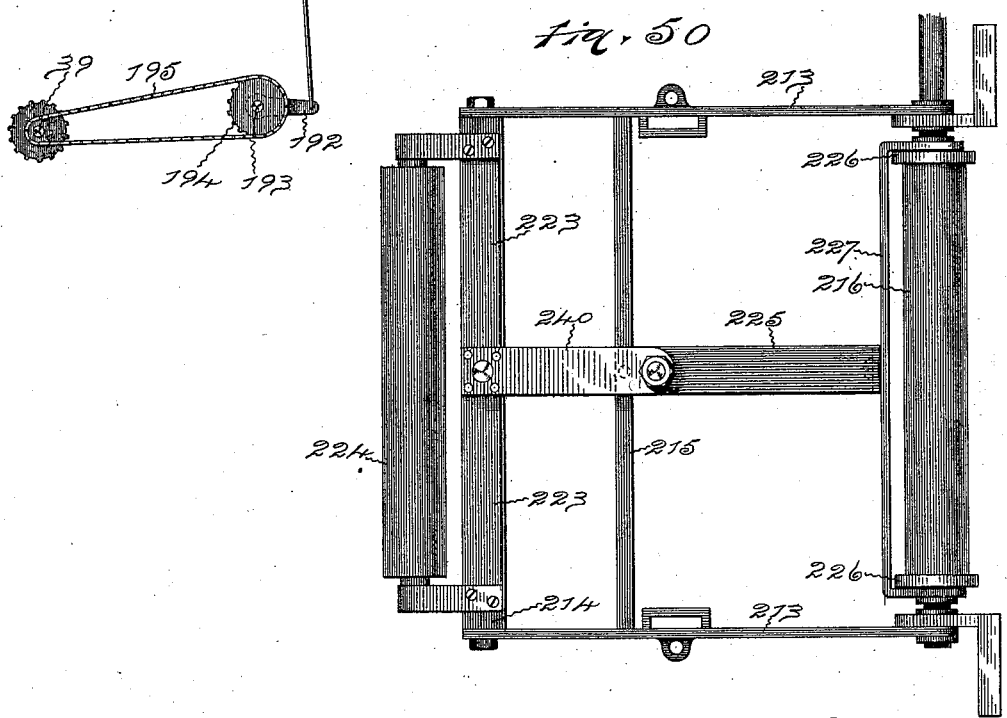

UNITED STATES PATENT OFFICE.

EBENEZER B. BEECHER, OF WESTVILLE, AND JACOB P. WRIGHT, OF NEW HAVEN, CONNECTICUT, ASSIGNORS TO THE DIAMOND MATCH COMPANY, OF CHICAGO, ILLINOIS.

MACHINE FOR MAKING MATCHES.

SPECIFICATION forming part of Letters Patent No. 528,457, dated October 30, 1894.

Application filed August 21, 1893. Serial No. 483,671. (No model.)

*To all whom it may concern:*

Be it known that we, EBENEZER B. BEECHER, residing at Westville, and JACOB P. WRIGHT, residing at New Haven, in the county of New Haven and State of Connecticut, citizens of the United States, have invented certain new and useful Improvements in Machines for Making Matches, of which the following is a specification.

The invention relates to the class of machines for making matches in which an endless chain is employed to conduct the splints from mechanism to mechanism to automatically complete the matches, and the object is to simplify the construction of such a machine and arrange the mechanisms so that they may be readily adjusted for making matches of different lengths or adjusted for wear of the parts, also for applying various different compositions in an efficient manner.

Figure 2:
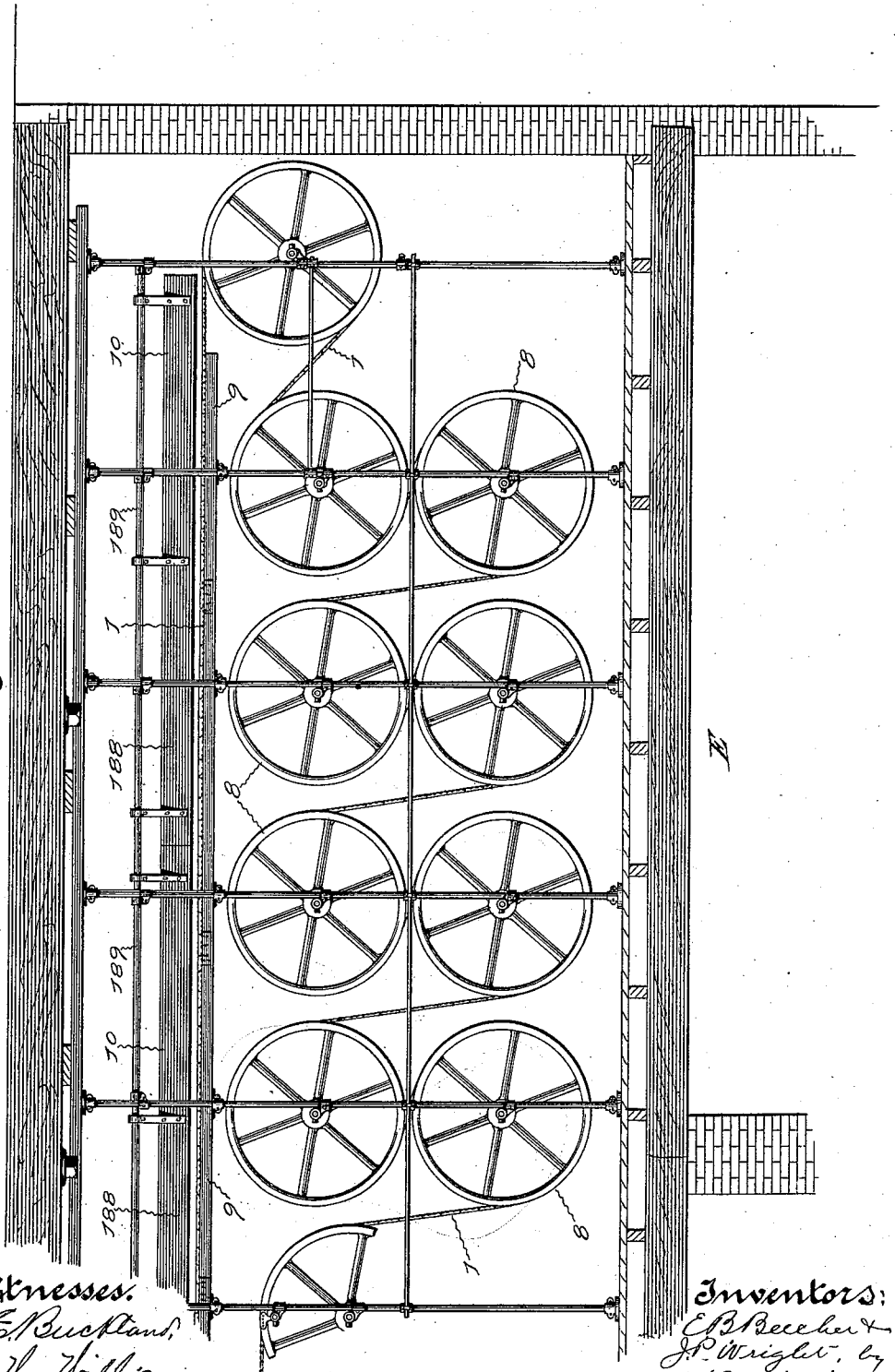
Figure 3:
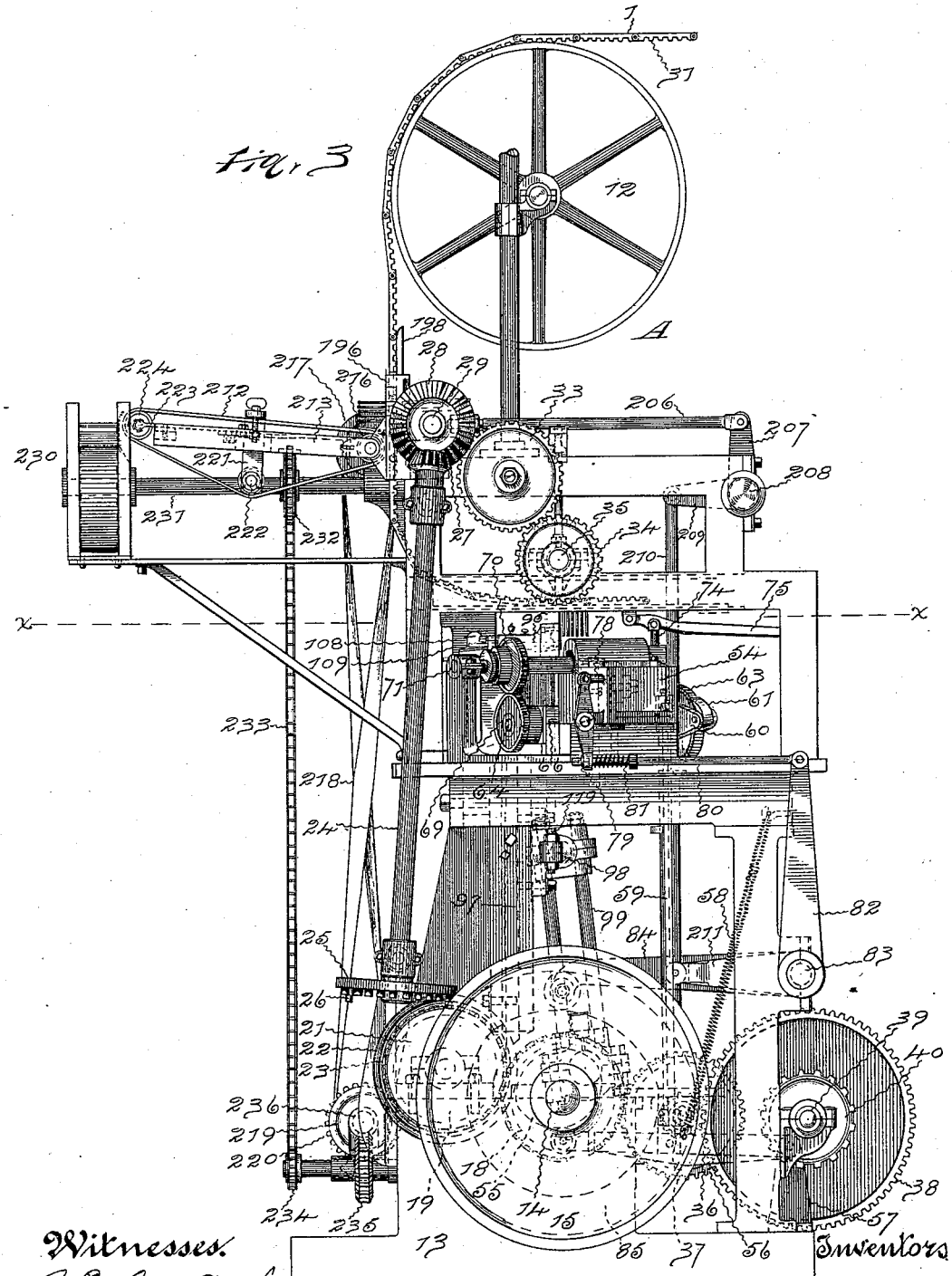
Figure 4:
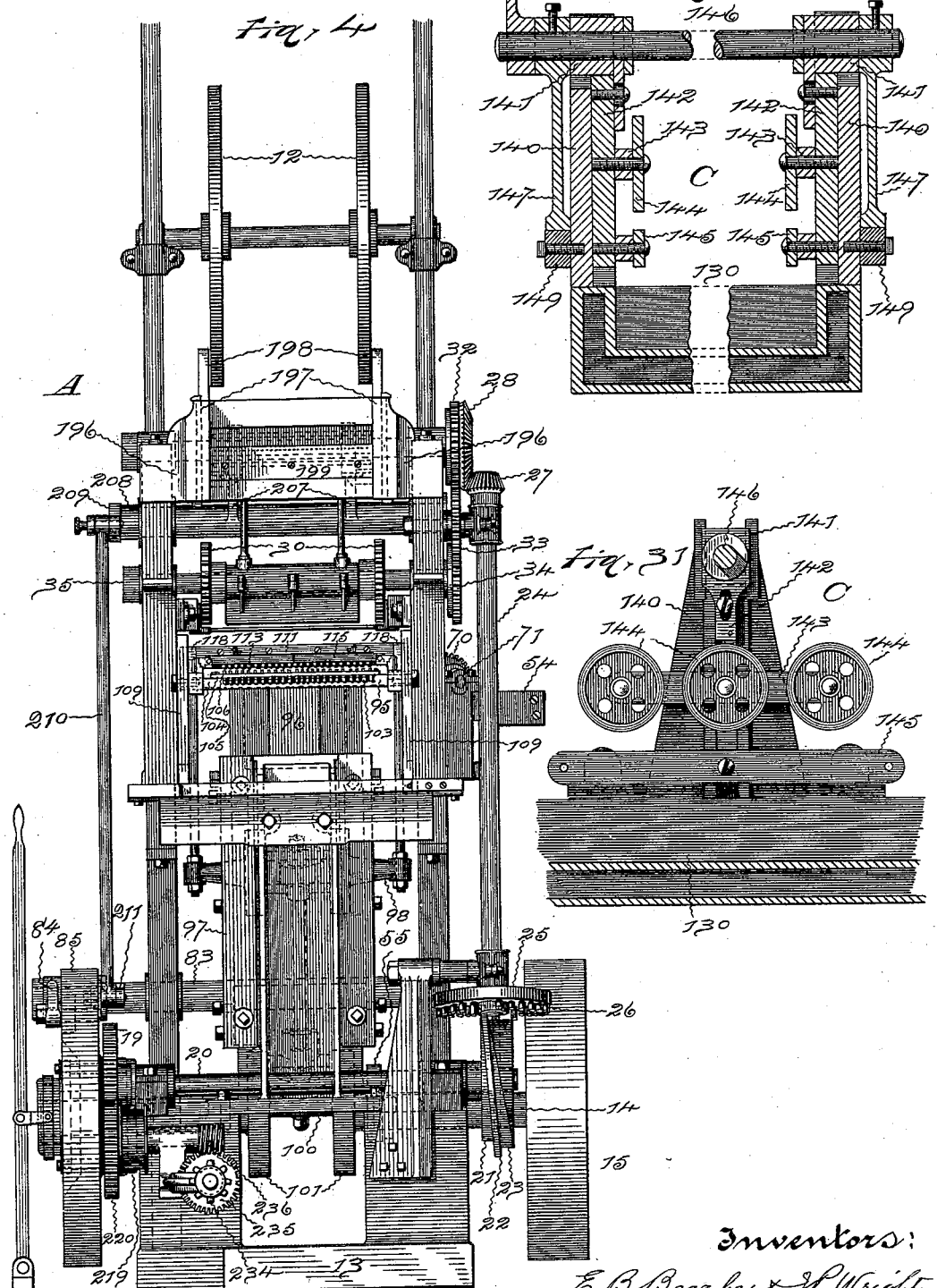
Figure 5:
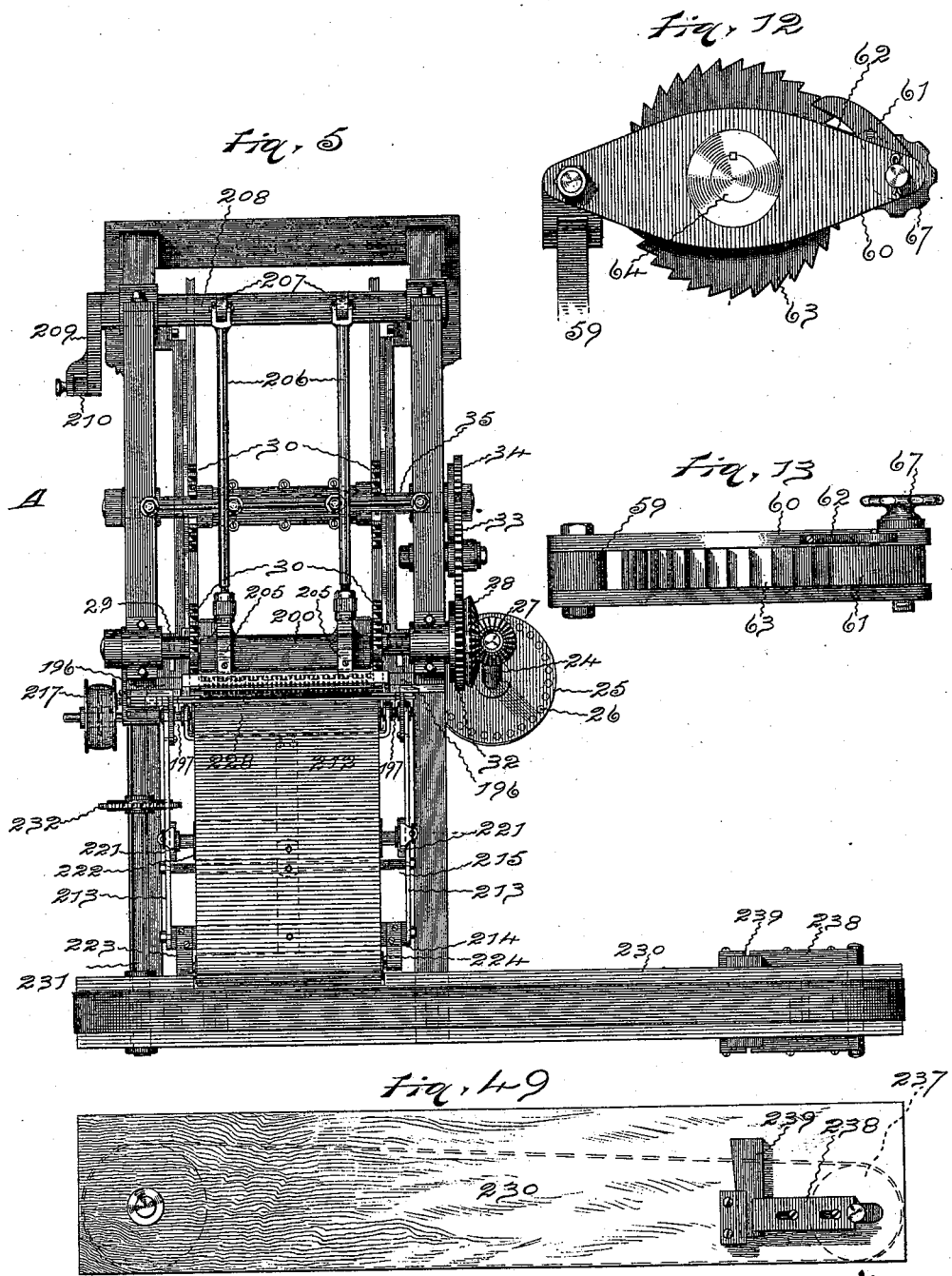
Figure 6:
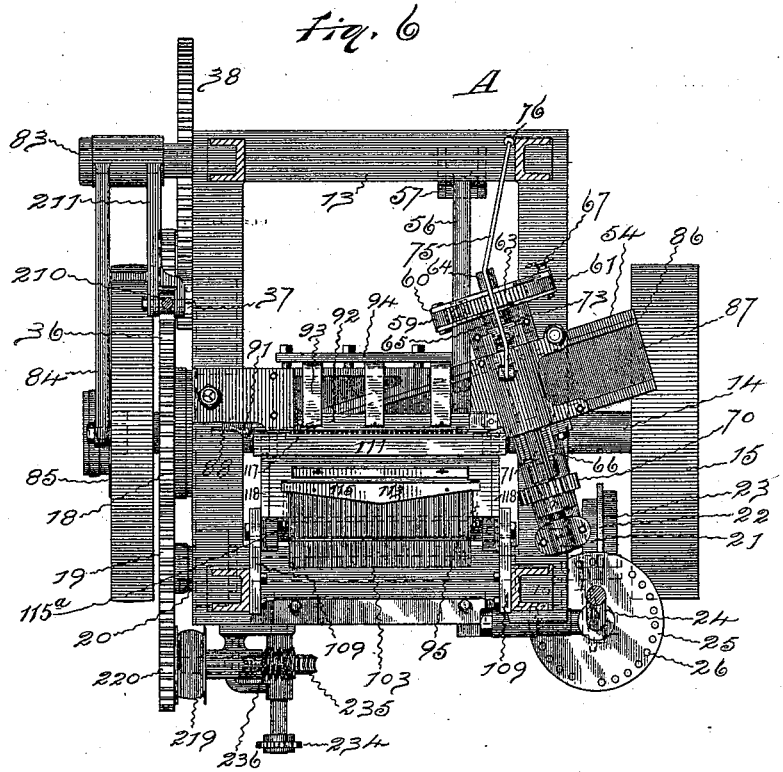
Figure 9:
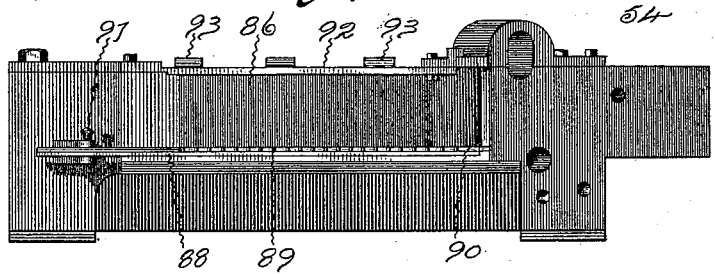
Figure 32:
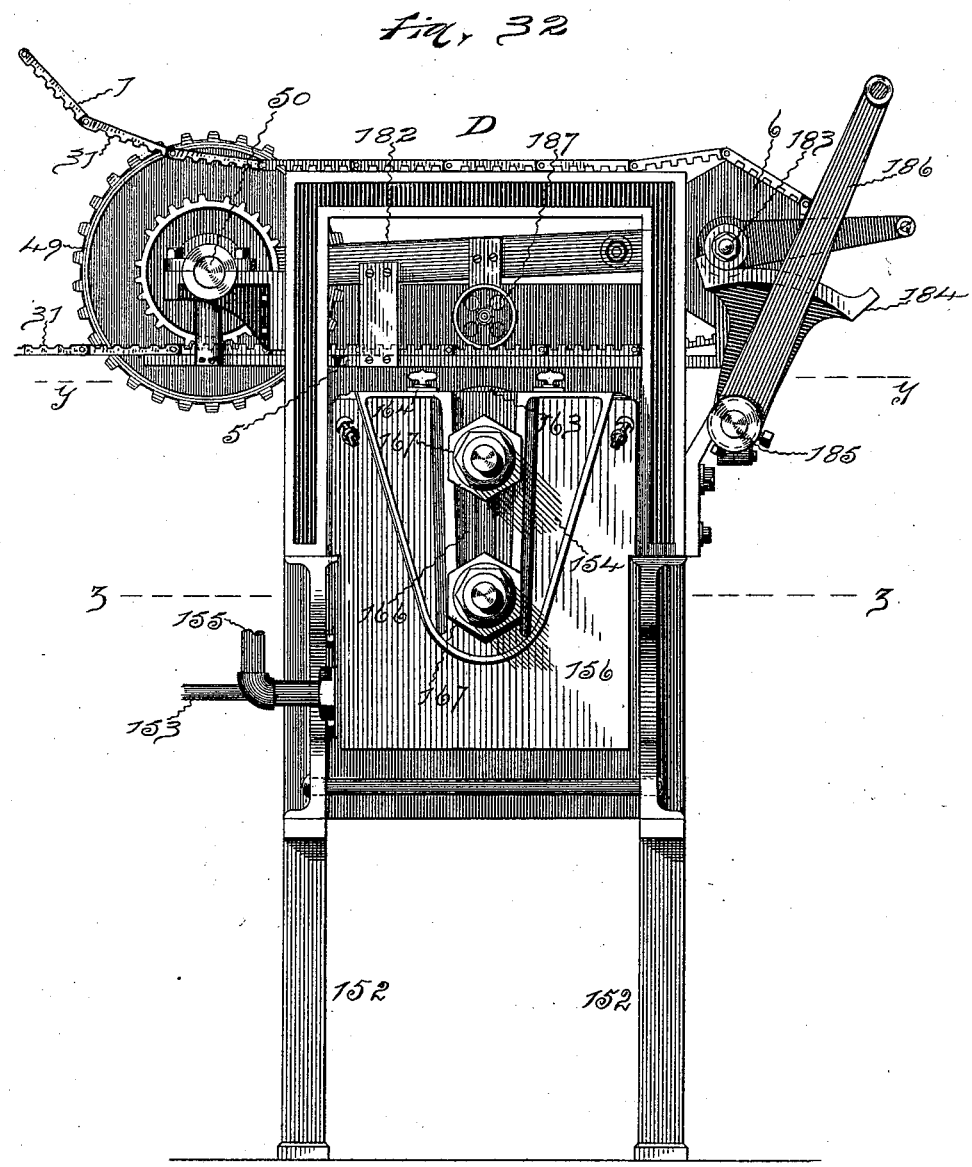
Figure 33:
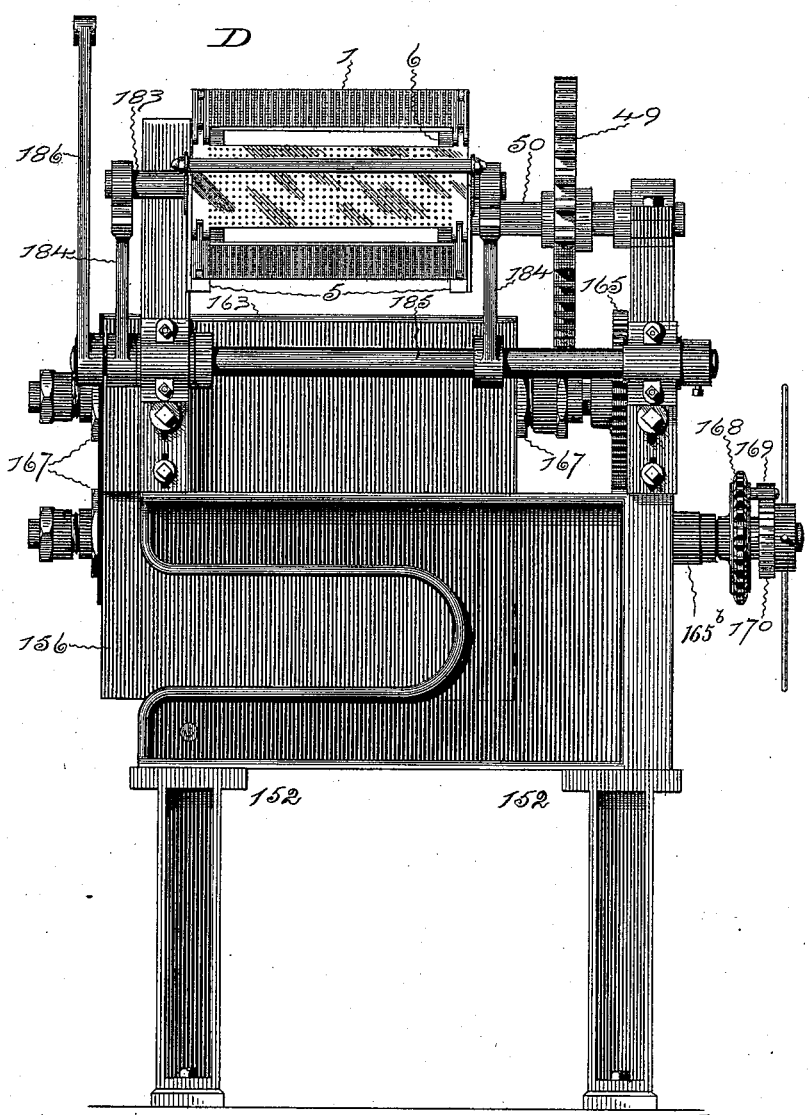

Referring to the accompanying drawings, Figure 1 is a general elevation of the machine proper, the heater, the wax dipping apparatus, the composition applying apparatus, a portion of the drying apparatus and the delivery mechanism. Fig. 2 is an elevation of the drying fan and the rolls around which the endless chain passes for drying the matches, this figure being a continuation of Fig. 1 and with that figure represents the entire machine. Fig. 3 is a side elevation of the machine proper. Fig. 4 is an end view of the same. Fig. 5 is a plan of the machine and the delivery mechanism. Fig. 6 is a horizontal section of the machine on plane denoted by the line X X of Fig. 3. Fig. 7 is a plan of the block feeding mechanism. Fig. 8 is an elevation of the latter. Fig. 9 is an edge view of the feeding trough. Fig. 10 is a transverse section of the same. Fig. 11 is a view of the front end of this trough. Fig. 12 is a side view of the block feeding roll ratchet. Fig. 13 is an edge view of the same. Fig. 14 is a side elevation of the splint cutting mechanism. Fig. 15 is a rear elevation of the same. Fig. 16 is an enlarged detail side elevation of the cutting head. Fig. 17 is a view of the back edge of the cutting head. Fig. 18 is an enlarged vertical section of the cutting-head, block-trough and a portion of the chain with a few splints in place. Fig. 19 is an enlarged plan of the cutting-head. Fig. 20 is a side elevation of the chain feeding mechanism. Fig. 21 is an end elevation of the same. Fig. 22 is a detail plan of a part of the latter. Fig. 23 shows detail views of the perforated chain plates. Fig. 24 is a detail view of the heating system. Fig. 25 is a side elevation of the waxing apparatus. Fig. 26 is an end elevation of the same. Fig. 27 is a view of the opposite side. Fig. 28 is a detail enlarged sectional view of a portion of the wax melting tank. Fig. 29 is a plan of the same. Fig. 30 is a vertical section through the dipping pan and the chain carrying mechanism above. Fig. 31 is a detail inside view of one side of the same. Fig. 32 is an enlarged side elevation of the composition applying mechanism. Fig. 33 is an end elevation of the same. Fig. 34 is a vertical section of the same. Fig. 35 is a side elevation of one side of the same. Fig. 36 is a horizontal section of the same on line Y Y of Fig. 32. Fig. 37 is a similar view on line Z Z of the same figure. Fig. 38 is a plan of the driving mechanism of the composition applying apparatus. Fig. 39 is a view of one side of the same. Fig. 40 is a view of the opposite side of the same. Fig. 41 is a front elevation of the discharge mechanism. Fig. 42 is a side elevation of the same. Fig. 43 is a detail enlarged section of the discharge head. Fig. 44 is an enlarged front view of the latter. Fig. 45 is a plan of the delivery mechanism. Fig. 46 is an elevation of the same. Fig. 47 is a vertical section of a portion of the same. Fig. 48 is a detail sectional view of another portion of the same. Fig. 49 is a side view of the delivery belt and frame. Fig. 50 is a plan of the delivery apron adjusting mechanism. Fig. 51 is a detail view of the fan and operating mechanism.

The machine part, or the part into which the blocks are fed and the splints cut, is indicated by the letter A, and from this part the endless chain, 1, travels over a bridge, 2, to the guideways, 3, that are supported by the frame above the heater, B. At the end of these guideways the chain travels above a waxing apparatus, C, and then onto other guideways, 4. From these latter guideways the chain travels to a movable bridge, 5, over the composition applying apparatus, D, and then around a small drum, 6, to a carrier pulley, 7. (Fig. 1.) From this it travels around the pulleys, 8, of the drier, E, (Fig. 2) and back toward the machine along a guideway, 9, supported by the frame above the machine, under a fan, 10. After traveling over the carrier pulleys, 11 and 12, the chain descends into the machine where the matches are ejected onto an apron that delivers them to a belt running in another direction from which they are easily gathered into trays. (Fig. 1.)

Supported near the bottom of the metallic frame, 13, of the machine, A, is the main shaft, 14, the pulley, 15, of which is belted, in the arrangement shown, to a pulley on a countershaft, 16, supported beneath the floor of the factory in which the machine is located, this countershaft bearing a pulley that is belted to a line shaft, 17, driven from the engine. (Fig. 1.) On the main shaft, 14, is a gear, 18, meshing with a gear, 19, on a parallel shaft, 20, that bears a cam-disk or worm, 21. Formed on the periphery of this cam disk are the two cams or worms, 22 and 23, of different height and different pitch, and connected to the end of the shaft, 24, that is supported nearly vertical in bearings in arms projecting from the side of the frame is a disk, 25, having downward projecting pins, 26, adapted to make contact with the peripheries of the cams, 22 and 23, a portion of the pins being of one length to engage with the outer cam, 22, while the other pins are longer in order to engage with the inner cam, 23. (Figs. 3, 4, 20, 21 and 22.) The pins are arranged on the disks in two series, whose adjoining ends are separated from each other by spaces substantially equal to the distance between the planes of the opposite sides of the cams on disk 21, where the cam of greater pitch diverges most from the other cam or rib. The spaces between the adjoining pins in either series are substantially equal to the thickness of the worm or cam rib of the lesser pitch. The longer pins, of which there is one for each series, are situated at corresponding ends of said series of pins, and the total number of pins of both lengths in each series, is equal to the number of transverse rows of perforations in each plate of the splint carrying chain. The inclined faces of the cams or worms 22 and 23 extend only partially around the disk 21. On the rest of the periphery of the latter the faces of the cams or worms are in planes at right angles to the axis of rotation of the disk; so that, while engaging the pins on disk 25, they will not only not move the latter, but will hold it and, consequently, the shaft 24, from rotating, until the inclined faces come around again. By means of this arrangement the rotation of the cam-disk causes the pin-disk and its shaft to be fed with an intermittent movement a certain distance when the short pins engage the outer cam and to be fed a greater distance when the longer pins come into contact with the lower cam, which has a greater pitch. The upper end of this shaft, 24, bears a bevel gear, 27, which meshes with a bevel gear, 28, on a shaft, 29, bearing sprocket wheels, 30, that mesh with the teeth, 31, on the ends of the perforated plates which form the links of the chain, 1. This shaft, 29, also bears a gear, 32, that meshes with an idle gear, 33, in mesh with a gear, 34, on a shaft, 35, which bears sprocket wheels, 30, that also engage the teeth on the chain plates. (Figs. 20 and 21.) With this construction, and the sprocket or toothed wheels 30 engaging the teeth 31 on the perforated plate, at or near the points where the match splints are inserted and the matches are discharged, the plates of the chain 1, which are being filled or unfilled, will be held positively locked from movement in either direction; while the plane faces of the cams or worms 22 and 23, which are in planes at right angles to the axis of rotation of the disk 21, are in engagement with the pins on disk 25, and will be moved, to the desired extent of the step by step movement, by the inclined faces of the cams, subsequently engaging such pins, the periods of rest corresponding with those during which the splint sticking and match discharging mechanisms to be hereinafter described, are operating.

The perforated plates of the endless chain are joined together by means of pivots at their ends so as to form a chain, and where the pivots pass the teeth cannot be cut so that the sprocket wheels which drive the chain necessarily have certain teeth cut away, and when this mechanism is in motion the chain, which is ordinarily moved at this part of the machine with a regular intermittent movement, is given a double length movement by means of the long pins which make contact with the lower cam, as described, when the sprocket teeth reach the part of the chain where no teeth are formed. (Figs. 20, 21 and 23.) The gear, 18, on the main shaft, 14, also meshes with a gear, 36, to which is secured a pinion, 37, that meshes with a gear, 38, on a shaft, 39, that bears a sprocket, 40, around which passes a chain, 41, to a sprocket, 42, on a shaft that bears a pinion, 43. This latter pinion meshes with a pinion, 44, in mesh with a gear, 45, on a shaft, 46, borne by the frame secured to the floor of the factory near the composition applying apparatus, D. The shaft, 46, bears two sprocket wheels, 47, around one of which passes a sprocket chain, 48, to a sprocket wheel, 49, on a shaft, 50, supported by the composition applying apparatus frame below the carrier pulley, 7. (Figs. 1, 34, 38, 39 and 40.) On the shaft, 50, are two sprocket wheels that mesh with the teeth on the splint chain as it leaves the guideways, 4. Around the other of these sprockets, 47, passes a chain to a sprocket, 51, on a shaft, 52, which bears sprockets, 53, that mesh with the teeth on the chain as it travels along the guideways, 9, under the fan. (Figs. 1, 25 and 26.) The chain is somewhat slack and while it is driven through the machine with an intermittent movement this latter mechanism drives it with a regular movement through the remainder of its passage around the drying wheels and back to the machine.

Blocks of just the length of the finished matches are placed in the trough, 54, and fed into the machine from the side. (Fig. 3.) On the main shaft, 14, is a cam, 55, held in contact with the periphery of which by means of a spring, 58, is a roller on the end of a lever, 56, pivoted to a bracket, 57, on the base of the frame of the machine. Hinged to this lever is a vertically reciprocating rod, 59, that is connected at its upper end with a frame, 60, that oscillates on the shaft, 64, by the side of a ratchet, 63 fixed on such shaft. This frame, to which the vertical rod is hinged, has a pawl, 61, that engages with the ratchet, 63, and a spring, 62, holding the pawl against the teeth of the ratchet. The pawl is provided with a handle, 67, by means of which it can be turned so as to disengage the ratchet when desired. (Figs. 7, 8, 12 and 13.)

On one side the bearing for the shaft, 64, is firmly held in the bracket, 65, fastened by means of bolts to the side of the trough, while on the other side a bearing is formed in a block, 66, that has a free vertical movement. The shaft, 64, bears a roll, 68, the grooved periphery of which projects slightly above the surface of the trough, and this shaft also bears a gear, 69, in mesh with a gear, 70, on a shaft, 71, that bears a similar grooved roll, 72, supported above the feed trough. One end of this shaft, 71, is rotarily supported in a bracket secured to the frame of the machine while the other end is held in the block, 73, having a free vertical movement. This block is held down by means of an arm, 74, projecting from the lever, 75, pivoted to the frame and normally held downward by means of a spring, 76. (Figs. 3, 6, 7 and 8.) Pivoted to one side of the trough is a lever, 79, one end of which bears a plunger, 78, that passes through the wall of the trough and thrusts against the block that is being fed through, so as to hold it tightly against the guiding side of the trough. The other end of this lever is elastically connected to a rod, 80, by means of a spring, 81, this rod being pivoted to the end of a rocker arm, 82, on the shaft, 83, that is oscillated by means of an arm, 84, that is rocked by a cam cut in the face of the disk, 85, on the main shaft, 14. (Figs. 3, 7 and 8.) As indicated in the drawings, the rod has a shoulder or collar, between which and the lever 79 the spring 81 is placed, so as to force such lever outward, with a yielding pressure, toward a suitable stop nut or collar on the rod. By means of this mechanism the ratchet is driven with an intermittent movement which causes the grooved rollers to feed the blocks forward into the machine at intervals, and during the period of rest the plunger pin knocks the blocks toward the guiding side of the trough so that they will pass into the machine properly. The spring 81 will yield to allow the lever 79, with its plunger 78, to accommodate itself to any variation or change in the size of the blocks, or in the positions which they are to have in the trough. The base of the trough is supported on blocks F on the side wall of the machine proper which can be removed or inserted, (Fig. 9) to regulate the height of the trough and permit of an adjustment so that blocks of different thicknesses may be used for forming matches of different lengths. When the trough is lowered a larger gear is placed on the shaft, 64, so as to mesh with the gear, 70, that is not adjustable.

The feed trough, 54, is placed at an angle with the machine so that the blocks are fed in obliquely, and the walls of the trough on the longer side are made double, the lining piece, 86, being formed of hard metal which can be readily removed when it becomes worn or when it is desired to make it thick for feeding blocks at a little different position, while on the bottom of the trough is a piece, 87, that is similarly removable. (Figs. 6, 7, 8, and 18.)

On the front edge of the frame extending across the machine at an angle with the axis of the trough is a plate, 88, from the upper surface of which project a number of short pins, 89. This plate, which is a long narrow strip of metal, is provided with a flange that is secured in place by a flanged overhanging piece, 90, secured to the bottom of the trough. (Figs. 10 and 18.) A set screw, 91, passing through ears on the side of the trough, holds the plate, 88, in place and when it is desired to remove the plate to re-grind the pins or insert a new one in place, should one become damaged or broken, this set screw is loosened and the plate pulled out from beneath the flanged overhanging plate, 90. Across the upper front edge of the trough a bar, 92, is loosely secured and firmly pressing upon this bar to hold it down are spring fingers, 93, that pass over the top and down the back of the trough. These fingers are adjustably clamped to the back edge of the trough by means of a bar, 94, held by screw bolts that pass into the back side of the trough. (Figs. 6, 7, 9, 10 and 18.) By means of this arrangement the blocks are held down to the bottom of the trough firmly but with a yielding pressure when fed to the cutter, a number of which cutters are removably held in the cutter head, 95, that is secured to a slide, 96. This slide has a free, vertical movement in ways, 97, formed in a vertical part of the frame of the machine, and adjustably secured to one side of the slide is a wrist pin, 98, that is joined by means of a connecting rod, 99, with a crank pin, 100, that passes between the disks, 101, on the main shaft, 14, so that the rotation of the shaft reciprocates the slide and the head. (Figs. 4, 14, 15, 16, 17 and 18.) A plate, 102, is secured to the upper end of the slide and in the upper surface of this plate, which is slightly inclined from the horizontal, a number of rectangular grooves are cut parallel, equal distances apart. In these grooves are placed sliding steel backers, 103, the projecting ends of which are clamped in grooves in the bar, 104, by means of the plate, 105, secured to the top of the bar, pins, 106, passing through the parts to hold the backers to the bar. (Fig. 18.) The ends of this bar are provided with studs on which are placed rolls, 107, that travel in cam grooves, 108, formed in plates, 109, secured to the sides of the frame, so that when the slide moves up and down vertically the backers are moved in and out through the grooves in the head by means of these cams. (Figs. 3, 18 and 19.)

To the edge of the plate, 102, a knife, 110, (Fig. 18) is secured in such manner as to trim the front of the blocks when they are presented beneath the cutters. To the top of this plate, 102, is secured by screws and dowel pins the cutter block, 111, in the lower surface of which a number of parallel rectangular grooves are cut, these grooves corresponding to and coinciding with the grooves for the backers just described. A plate, 112, is placed on the bottom to inclose these cutter grooves and also cover the backer grooves in the plate below, this plate, 112, being formed on a taper in order to fill the space between the parts as the upper surface of the lower plate is inclined, while the bottom surface of the upper plate is horizontal, so that the backers will project just below the blades of the cutters, 113, that are on rectangular steel pieces with circular cutting openings or eyes. These cutters with pins, 114, driven into perforations in the cutters, are placed in the cutter grooves and firmly held in place by means of a block, 115, that is removably held by screws 115$^a$, in a mortise in the top of the block in front of the pins 114 so as to clamp the pins against the face of the mortise. (Figs. 18 and 19.)

When a cutter breaks or becomes dulled, by removing the block, 115, any of the cutters can be pulled out by means of a hook inserted into the perforation, 116, in the end of the cutter which it is desired to remove. After the cutter, dulled or broken, has been reground, a new hole is bored for the holding pin and the cutter replaced in the groove and the block, 115, tightened against the pin as before.

The face of the cutter block, 111, is provided with a removable plate, 117, that has a slightly serrated face to back up the splints which are cut by the cutters as they descend with the head. (Fig. 19.) Plates, 118, are secured to the sides of the cutter block and these plates have slots for guiding the ends of the backer bar, 104, that moves to reciprocate the backers in and out, while to stiffen the parts rods, 119, are secured between the ends of the wrist pin, 98, on the slide and the ends of the head. (Figs. 14 and 15.) After the blocks have been fed forward and brought to rest the cutter head descends cutting the edge of the blocks into splints, which, as the head rises are carried up with the cutters. At this time the cam slots 108 force the backers out under the cutters to back up the splints which then, as the head continues to rise, are driven into the perforations of the plates of the chain which happen to be above. Then, as the head descends, the backers are drawn out of the way by the cam slots on the frame so that the cutters cut a new row of splints from the blocks which have been fed forward by the feeding mechanism. This operation is repeated until all the wooden blocks are used up, all of which blocks are utilized as they are fed in on an angle. Of course, the plates of the chain are fed along by the movement described at the right interval to present a row of open perforations for each succeeding series of splints cut by the cutters and raised by the cutters and backers.

The splints hanging downward are carried along as the chain advances over the heater, B, which dries and warms the wood. This heater is a thin, rectangular metal chamber, 122, that is placed directly below the moving chain. Live steam is admitted to this chamber from a supply pipe, 123, through a branch pipe, 124, the outlet being through the branch pipe, 125, that leads to the exhaust pipe, 126. (Figs. 1 and 24.) After being warmed by passing above the heater the splints are passed to the waxing apparatus, C, that is located adjacent to the end of the heater. On one side of the path of the chain is a tank, 127, having hollow walls and in this tank the waxing composition, usually paraffine, is melted and mixed. The chamber between the walls of this tank is connected by means of a branch pipe, 128, with the live steam supply pipe, 123, and also with the exhaust pipe, 126, by a branch pipe, 129, and by means of these connections the tank can be heated to the desired degree. (Fig. 24.) Beneath the path of the chain alongside of this tank, 127, is a shallow pan, 130, with hollow walls, and the melted paraffine is transferred from the melting tank into this pan into which the splints are dipped. The chamber between the walls of this pan is connected by means of a branch pipe, 131, with the live steam supply pipe, 123, and by a branch pipe, 132, with the exhaust pipe, 126, so that when it is desired this pan may be kept warm to keep the waxing composition in a proper liquid state. (Fig. 24.)

The paraffine is lifted from the mixing tank, 127, by means of a bucket, 133, on the end of a rod, 134, the opposite end of which is connected with a crank on the end of a shaft, 135, supported in bearings secured to the under side of the guideways, 9, at the top of the frame. On this shaft, 135, is a sprocket wheel around which passes a chain from a sprocket on the end of a shaft, 52, which bears the upper chain sprockets, 53, so that when the machine is in motion the crank raises and lowers the bucket out of and into the paraffine mixing tank. (Figs. 1, 25 and 26.) Every time that this bucket is lifted a hook, 136, on its side engages a bail, 137, on the edge of the tank so that the bucket is tilted and the melted paraffine allowed to flow out and run down the channel, 138, into the pan, 130. (Figs. 28 and 29.) In this manner the pan is kept full of paraffine although it is absorbed by the splints as they come around on the chain. Between the melting tank and the dipping pan the walls are provided with channels, 139, to permit the excess of melted paraffine in the pan to flow back into the tank and thus the level of the wax in the pan is always kept the same and a circulation maintained between the tank and the pan. Projecting upright from each side of this pan are two standards, 140, and in the top of these are movable blocks, 141, that are connected with slides, 142, that bear bars, 143, with anti-friction rollers, 144. These slides also support the pivoted tracks, 145, and the chain in its movement passes between the rolls and the track above the dipping pan. The movable blocks, 141, are connected by a shaft, 146, to which are secured segmental cams, 147, and a rocker arm 148. These cams rest on rollers, 149, journaled on stationary bearings on the sides of the standards so that when the rocker arm is moved the blocks and slides bearing the rollers and tracks are raised or lowered so that the splints will pass freely over the paraffine dipping pan, or they will be dipped into the pan and become soaked with the wax, as desired. (Figs. 25, 26, 27, 30 and 31.) The rocker arm is connected by means of a link, 150, with a sliding rod, 151, having a handle near the machine proper, so that when the rod is moved the chains are raised or lowered, allowing the attendant to dip the splints or raise them while standing near the machine proper. (Fig. 1.) At the end of the guideway, 4, the splints come to the composition applying apparatus, D.

On a frame, 152, standing on the floor, rests a tank, 156, that has hollow walls for the reception of hot water or steam in order to keep liquid the composition which is in the vat, 154, that is loosely supported by this heating tank. A branch pipe, 153, extends from the live steam pipe, 123, into this tank and terminates in a perforated end so that live steam may be admitted to heat the water in the tank when it is desired to warm the water quickly. This water in the tank enters through a pipe, 155, from a circulating cylinder, 157, and passes back to the heater of the circulator through the outlet pipe, 158, the circulating cylinder being kept warm by steam which enters through the pipe, 159, connected with the live steam pipe, 123. (Fig. 24.) This arrangement permits the composition in the vat to be kept at an even temperature by the circulation of warm water which is heated by the live steam in the circulator cylinder, but the tank can be more quickly warmed on starting by letting live steam in through the pipe, 153, when desired. When the pipes are disconnected the tank may be readily lifted from place.

The composition vat, 154, is loosely supported by the walls of the tank in such manner that it is readily and uniformly heated. Supported by journals, in the bottom of the composition vat is a mixer, 160, for stirring and keeping the composition at a uniform consistency. This mixer is an open frame, 161, having sharpened side plates, 162, that during revolution pass close to the walls of the interior of the vat. (Figs. 34 and 37.) On a shaft supported by suitable bearings held by the walls of the vat above this mixer is a roll, 163, that turns in the composition and brings it up to be applied to the heads of the splints as they pass along, scrapers, 164, being placed across the upper edge of the vat adjacent to the roll to prevent the adhesion of too much of the composition to the roll. (Figs. 34 and 36.) At one end the shafts of the mixer and the applying roll are squared to fit into the squared sockets formed in the hubs of the intermeshing gears, 165, one of which is fixed upon a shaft $165^a$, which forms a journal for the gear, and is supported in a suitable bearing $165^b$ on the frame which supports the tank and vat, and is in line with the shaft of the mixer; while the other gear has a short shaft $165^c$ also journaled in a bearing in said frame, in line with the shaft of roll 163. It is preferred that the gear for the roller be larger than for the mixer so that the roller will revolve slowly while the mixer moves rapidly. Each end of the vat has a portion cut away and in this portion are set plates, 166, which are held against the ends of the vat by means of the clamping nuts, 167, so that there can be no leakage when they are secured in place. These plates, 166, have the bearings for the shafts or journals of the mixer and the composition applying roll, and when the clamping nuts are loosened by raising out these plates the roll and mixer can be readily removed without disturbing the position of the vat. (Figs. 32, 34, 36, and 37.) On the shaft $165^a$, beyond the bearing $165^b$ is the loose sprocket, 168. This sprocket is provided with a pawl, 169, that engages with a ratchet, 170, fast on the shaft $165^a$ forming a journal of the gear for the mixer; so that such shaft and, consequently, the mixer shaft turning gear, will rotate with the sprocket, and when it is desired to stop the rotation of the mixer this pawl can be disengaged from contact with the teeth of the ratchet, allowing the sprocket to turn idle. (Figs. 35 and 36.) Around this sprocket, 168, passes a chain from a sprocket, 172, loosely mounted on the shaft, 46, which is driven by the sprocket, 42. (Fig. 38.) The sprocket, 172, bears two pawls, 173 and 174, one of which, 173, engages with a ratchet wheel, 175, fastened to the shaft, 46, so that when the shaft is rotated, through this mechanism the mixer is worked, while the other pawl, 174, engages a ratchet wheel, 176, fastened to a bevel gear, 177, loosely borne by the shaft, 46. In mesh with this is a bevel pinion, 178, on a shaft, 179, that passes through the floor of the factory and is rotated through the gears, 180, by the counter shaft, 181, that is driven by a belt from the line shaft, 17. (Figs. 1, 38, 39, and 40.) By means of this arrangement when the machine is stopped and the shaft, 46, is not rotated by the chain, 41, the mixer is still slowly revolved by the driving mechanism set in motion from the line shaft, so as to stir the composition and prevent it from settling and thickening.

When it is desired to change the composition, the vat, which is V-shaped in cross section, is simply removed from the tank, and another with composition of different constituency or different color is thrust back in its place, the ends of the journals of the roller and mixer sliding from or entering into the sockets in the hubs of the gears mentioned. (Fig. 37.) Hinged on the shaft, 50, that is supported by brackets fast to the walls of the standard of the composition applying apparatus is a frame, 182, the other end of which bears a shaft, 183, that supports the drum, 6, around the periphery of which passes the endless chain. At about the middle this frame bears a small roll, 187, that presses down upon the chain to hold the plates to the bridge, 5, which is supported at one end by arms projecting from the frame and at the other by arms depending from the shaft, 183, so that the bridge moves with the frame. The outer ends of this shaft, 183, are usually supplied with rolls, which rolls rest on the surfaces of the segmental cams, 184, fast to the shaft, 185, which is oscillated by means of a rocker arm, 186, connected with the rod, 151, and when this rod is moved the cams are oscillated to raise or lower the bridge and small drum so as to cause the splints to be lowered to enter the composition on the roller beneath or raised high enough to pass by without receiving any composition. (Figs. 32, 33 and 34.) As the rod, 151, is connected with this mechanism and also with the raising and lowering device at the waxing mechanism, when the rod is moved the splints are lifted above the waxing pan and the composition vat at the same time so that the splints need not stand in the substances when the machine is idle. From this composition roll the endless chain with the splints travels around the carrier rolls or pulleys, 8, for long distances so that the composition may become hardened. (Fig. 2.) These rolls are supported in suitable bearings attached to the uprights of the frame, which is so formed of tubing that it is secured at its lower part to the floor and at the upper part to the ceiling of the factory in which the machine is placed. After passing the last of these pulleys the chain returns toward the machine proper along the guideways, 9, above which is placed the oscillating fan, 10. This fan is usually formed of a long board, 188, extending from end to end of the machine over the middle of the chain, which board is secured by arms fast to a rocking shaft, 189. This shaft, at one end has a rocker arm, 190, which is connected by a rod, 191, with a crank, 192, on a shaft, 193, bearing the sprocket, 194, connected by a chain, 195, with a sprocket on the shaft, 39, supported by the main uprights of the machine proper. (Figs. 1 and 51.) By means of this apparatus the fan is oscillated back and forth when the machine is in motion to facilitate the drying of the matches as they pass along the upper guideway back to the machine. After traveling over the carrier pulley, 12, the chain descends again to the machine proper. To the front upper edge of the walls of the machine proper a small frame, 196, is secured and to the face of this are attached plates, 197, and it is back of these plates that the chain passes as it descends again into the machine. (Figs. 3, 4, 41, 42 and 43.) Back of the opening through which the chain passes, above the little frame are the two guide arms, 198, and below this, partially covering an opening through the little frame is a hard metal plate, 199, having a row of perforations equal in number to the row of perforations across the plates of the chain. Supported on ways formed on this small frame or block, 196, is a movable carriage, 200, projecting from the front of which are ejecting pins, 201. These pins are held in perforations in a bar, 202, by means of a backing strip or slide, 203, and both of these are held to the carriage by means of the mortised strip or plate with an overhanging edge, 204, that is held in the recess in the face of the carriage by the clamping fingers, 205. (Fig. 43.) This carriage is connected by rods, 206, with rocker arms, 207, on a rocker shaft, 208, journaled in the frame and having a rocker arm, 209, that is connected by means of a rod, 210, with a rocker arm, 211, on the shaft, 83, that is oscillated by means of the cam, 85, on the main shaft, 14. (Figs. 41 and 42.) The cam oscillates this mechanism in such manner as to drive the discharging carriage forward so that the pins pass through the bridge plate and through a row of perforations in the chain plate in front and eject or drive out the completed matches from the plate as they come along, so that they will fall onto the apron, 212. (Figs. 5, 41 and 42.)

Attached to brackets on the front of the main frame is a small frame consisting of side arms, 213, an end piece, 214, and a brace, 215. Supported on journals near the inner end of the frame is a roller, 216, the shaft of which on one end bears a pulley, 217, around which passes a belt, 218, from a pulley, 219, secured to a gear, 220, that meshes with the gear, 19, on the shaft, 20, that is driven by the main shaft, 14. (Figs. 3 and 46.)

In screw adjustable plates, 221, movable in ways at about the middle of the frame are the bearings of the tightening roll, 222. At the other end of the frame pivoted to the cross piece, 214, is a yoke, 223, which holds the bearings of the front roll, 224, and the apron, 212, passes around these three rollers in its movement to carry away the ejected matches from the machine. Loosely mounted on the ends of the roller, 216, or on their shafts are collars, 226, the hubs of which are in the grasp of the forked ends of a yoke, 227, the shank 225 of which is pivoted to the cross brace, 215. Pivoted to this shank is a strap, 240, which is the shank of the yoke, 223, that bears the front roll. (Figs. 45, 47 and 50.) With this construction, if the apron, in running over the rollers 216 and 224, should tend to work toward one side, it would come in contact with and force the collar 226, on that side, outward; but any movement of the latter in that direction would, because of the engagement of the forked arm of yoke 227 with it, move such yoke, to swing its shank 225, so as to carry the inner end of strap 240 over toward the same side, to which the belt is working. This movement of strap 240 swings yoke 223 slightly on its pivot, so as to bring the roller 224, to stand at a slight angle to the roller 216, sufficient to cause the belt or apron to work back into its proper central position, which it must do, if the end of the roller toward which it had before worked, is moved away from the other roller. As the slightest travel of the apron will move one of the collars 226 correspondingly, to actuate the yokes 223 and 227, as described, the apron will be automatically kept in its proper position and effectually prevented from working to any distance out along the rollers, toward either side of the roller frame.

Supported in bearings adjacent to the roll, 216, close to the endless chain, just below the ejecting pins, is a rod, 228, that bears a smaller pulley, 229, in frictional contact with the inner surface of the rim of the pulley, 217, so that when the matches which have a tendency to stick in the chain and drop down by the chain come in contact with this rapidly revolving rod, they are thrown way out from the chain onto the moving apron. (Figs. 45 and 48.)

As will be seen from Figs. 3, 4, 20, 21, 45 and 46 the gear 220, to which the belt pulley 219 is secured, is smaller than the gear 19 with which it meshes, and which is fixed on and rotates with shaft 20, which in turn carries the cam disk or worm 21, with its two cams of different pitch, to engage the pins 26 on the disk 25 fixed on the shaft 24, so as to cause a partial rotation of such shaft 20, as indicated hereinbefore. Each partial rotation of shaft 24 is, as hereinbefore explained, sufficient to cause, through the meshing gears 27, 28, 32, 33 and 34, and the sprockets or toothed wheels 30, 30, on shafts 29 and 35, a movement of the chain of splint receiving perforated plates, to carry one row of perforations out of the path of the splint sticking or match discharging devices, and bring another row into such path.

As shown in the drawings, the gear 220 is much smaller than gear 19, the latter being of a diameter of one and two thirds that of the former; so that, for each revolution of shaft 20, and, therefore, for each forward movement of the chain of perforated plates, the gear 220 and, consequently, the pulley 219 will be given one and two thirds of a revolution.

With the pulley 217 on the shaft of the apron roller 216 substantially or nearly the size of the pulley 219, and the belt 218 running over both pulleys, the apron 212, which receives the rows of matches discharged from the perforated plates of the chain, will, for each movement of the chain, or between the times when adjoining rows of matches are discharged, be moved a distance nearly equal to one and two third times the circumference of pulley 219. Such distance is about that of the upper portion of the apron passing from roller 216 to roller 224, or several times the length of the matches to be conveyed by the apron.

The result of the construction shown and described is, obviously, that the apron will carry each row of matches, discharged upon it from a plate, well out away from the plate, before the succeeding row of matches is discharged upon it; and the different rows of matches, as delivered by the apron, will be well separated from each other, so as to fall into the trough or other receptacle, provided therefor, in distinct layers, not interlocking or interfering with each other.

With the construction of gearing and belting shown and described, a row of matches discharged from the apron will be carried well out toward the delivery end of the latter, before another row is deposited upon said apron.

Held by brackets fast to the walls of the machine is a trough-way, 230, which extends transversely of the machine. Journaled in bearings in the walls of this trough at the end adjacent to the delivery apron is a shaft, 231, that has a sprocket, 232, with a chain, 233, connecting with a sprocket, 234, secured to the worm wheel, 235, that is driven by a worm, 236, on the shaft that bears the pulley, 219, secured to the gear, 220, that meshes with the gear, 19, on the shaft, 20, that is driven by the main shaft, 14. (Figs. 3 and 46.) This shaft, 231, bears a pulley around which passes a belt to a pulley, 237, at the other end of the troughway. This pulley, 237, is mounted on a shaft which may be forced outward by means of a sliding block, 238, moved by a wedge, 239, in order to tighten this belt. (Figs. 5 and 49.)

The matches are ejected from the machine by the discharge mechanism onto the apron, which in turn delivers them to the belt which moves at right angles to the motion of the apron and from which the matches are collected by the attendant into trays for further drying or for packing into boxes.

In this machine the blocks of proper length are fed by the feed mechanism to cutters which cut the splints and carry them up and fasten them into the perforations of the endless chain, which carries them from mechanism to mechanism. The splints are heated, then dipped into melted wax, after which the composition is applied and they are carried around the rolls and beneath the fan for drying the composition. As the chain is about to return into the machine for fresh splints, the completed matches are ejected onto the delivery apron which delivers them in turn to the collecting belt.

The feeding trough is so arranged in this machine that any part which becomes worn can be removed and renewed, and the resting portion for the splints is so formed that the cutters can descend and completely cut the sticks without dulling the cutters. A head is provided with individual backers for each cutter, which can be removed at any time for repairing, and which are moved under the cutters at the proper time by a simple mechanism so that the splints will be firmly driven into the plates. The arrangement of the head is such that each or any of the cutters can be quickly renewed or replaced without disturbing any of the others.

The chain feed mechanism is simple and positive, feeding the chain the varying distances that it is required at the proper time. The heating system is simple and so arranged that the heater can be quickly warmed and kept warm, the wax quickly melted and kept liquid for the desired length of time; and the composition heating tank has means whereby it can be quickly heated by steam in starting the machine and it can be kept at a necessary uniform temperature by the water circulation. The arrangement of the waxing apparatus is such that there is always the exact quantity of melted wax in the dipping pan, the automatic mechanism transferring enough to keep a continuous circulation between the melting tank and the dipping pan.

In this machine the composition vat can be readily removed at any time without disturbing the connections, and the drive mechanism is so arranged that although the machine is stopped the mixer and the applying roll are kept in motion so as to keep the composition properly mixed and of uniform constituency.

A fan and its operating mechanism completely dry the matches to the proper degree before they reach the end of the machine without requiring an extraordinary number of rollers for the passage of the chain.

The discharge mechanism is so constructed that any of the ejecting pins can be replaced easily, and the delivery mechanism receives the ejected matches and gathers them into position whereby they can be quickly placed in trays or boxes; and finally, the delivering device is so arranged, that it delivers the matches, which are discharged upon it from the perforated plates of the splint carrying chain, in rows, well separated from each other, so as to pass into any provided receptacle in the form of distinct layers.

We claim as our invention—

1. In a machine for making matches, in combination with the block feeding trough provided with feeding mechanism and a stationary block guiding side, a reciprocating plunger for driving the blocks against the guiding side of the trough, and mechanism for reciprocating the plunger operated from the main drive of the machine, substantially as specified.

2. In combination with the block feeding trough and mechanism for feeding blocks through the trough, a reciprocating plunger, to engage the blocks and force them against one side of the trough, mechanism for reciprocating such plunger, and a spring interposed in such mechanism, to cause the plunger to be forced against the blocks with a yielding pressure, substantially as and for the purpose specified.

3. In combination with the block feeding trough and means for feeding the blocks along the same, a moving piece to strike and force the blocks over against one side of the trough, a lever for actuating such piece, a moving rod having a bearing to engage and move the lever, to retract the block engaging piece, and a spring engaging the lever and a bearing on the rod, substantially as and for the purpose specified.

4. In combination with the block feeding mechanism and a way for the blocks having a block-guiding face, a plunger to engage the sides of the blocks and force them over against the guide face, a lever to which the plunger is pivoted, a reciprocating rod passing through one end of the lever, a stop on such rod, to engage the lever and move it as the rod is moved to retract the plunger, and a spring on the rod between the other side of the lever and a bearing on the rod, substantially as and for the purpose specified.

5. In combination with intermittingly moved block feeding mechanism and the way for the blocks, having a block guiding face, a knocker to strike the blocks and force them against the guiding face, and mechanism causing such knocker to strike the blocks during the periods of rest of the feeding mechanism, and then recede from the blocks, substantially as and for the purpose specified.

6. In combination with the splint-cutting cutters and a suitable way for the blocks to be cut, means for moving the cutters through the blocks, a removable plate provided with pins in line with the cutters, a holder having a part engaging a longitudinal flange on the plate, so as to hold said plate with its series of pins in a line parallel to the line of the cutters, and detachable means for holding the plate from longitudinal movement, substantially as and for the purpose specified.

7. In combination with the cutter head carrying the splint-cutting cutters, a backer having faces to support the ends of the splints in the cutters made movable toward and from the lower side of the cutters at an angle that is oblique to the plane of the latter, substantially as and for the purpose specified.

8. In a mechanism for making matches, in combination with a reciprocating head, the splint cutters carried thereby, a backer supported on such head, so as to be movable thereon, and provided with splint supporting portions to be moved under and away from the cutters, cam-ways on a stationary support, and bearings on the backer engaging such ways, whereby the backer is moved on the cutter head, as it rises and falls with the same, substantially as and for the purpose specified.

9. In combination with the reciprocating head and the splint cutters attached thereto, the backer bars, one for each cutter, reciprocally supported on the head, a bar with which the backer bars are connected, and means for moving such head, to reciprocate the backer bars, in a direction transverse to the direction in which the cutters are moved as the cutter bearing head rises and falls, substantially as and for the purpose specified.

10. In combination with the reciprocating head carrying the splint cutters, the backer bars, one for each cutter, supported on the head, so as to move up and down therewith, while being longitudinally movable thereon, so as to be moved out under the cutters and back again, a bar carried by said head to which the backer bars are attached, bearings on this bar, and cam-ways, on a suitable stationary support, whereby such bar is moved relatively to the head to carry the backer bars out under the respective cutters, during a portion of the upward travel of the cutter head, substantially as and for the purpose specified.

11. In combination with a head carrying a splint cutter adapted to cut a splint from a block, a backer, to support the splint end in the cutter, made movable obliquely toward and from a point in line with the splint, and also toward and from the cutter, and means for actuating such backer, substantially as and for the purpose specified.

12. In combination with a head carrying a splint cutter adapted to cut a splint from a block, a backer, for supporting the end of the splint held in the cutter, made movable toward and from its splint supporting position under the cutter, and a suitable guide for such backer guiding it at an angle to the plane of the end of the splint holding opening in the cutter, whereby, as the backer is moved toward its operative position, it also moves up toward the end of the cutter opening, and means for actuating the backer, substantially as and for the purpose specified.

13. In combination with a reciprocating head carrying a splint cutter, a reciprocating backer for such cutter, a guide for the backer extending at an angle oblique to the plane of the side of the cutter, at which it is to engage and support the end of the match splint, and means for reciprocating the backer, substantially as and for the purpose specified.

14. In combination with the reciprocating head for the splint cutters, the reciprocating backer bars for the cutters, guided, so as to be movable, on the head, and provided with pins, the actuating bar for the backers, a removable plate clamping the backers to such bar, provided with holes engaging the pins on the backers, and means for actuating this bar during the travel of the cutter head, substantially as and for the purpose specified.

15. In combination with the reciprocating head for the splint cutters, the backers guided in grooves in such head, the backer actuating bar secured to the backers, and guided in slots on portions of the head, rollers on the ends of such bars, and the cam-ways on stationary supports engaging such rollers, substantially as and for the purpose specified.

16. In combination with the series of splint cutters having shanks provided with pins, the block provided with grooves for the cutter shanks, a plate closing the open sides of such grooves, removably secured to the block, a shoulder on such block to engage the pins on the cutter shanks, and a plate removably attached to the block, clamping the pins against the block shoulder, substantially as and for the purpose specified.

17. In combination with the plate having the inclined grooves, the backers having their shanks guided in such grooves, the plate covering the open sides of the grooves, having its face opposite to that engaging the backer shanks at an angle to the plane of the latter, a block with grooved under face attached to such plate, and the splint cutters having their shanks in the grooves of the block, substantially as and for the purpose specified.

18. In combination with the longitudinally movable backers, the plate supporting them at an incline, the plate over them having its under side inclined and its upper face horizontal, and the splint cutters mounted upon such horizontal face, substantially as and for the purpose described.

19. In a machine for making matches, in combination with the chain carrier for the splints, a cam having cam surfaces of different height and different pitch, a rotary shaft, a disk thereon, carrying teeth of different heights to be engaged by the different cam surfaces, and suitable connections between the shaft and the carrier chain moving wheels, substantially as and for the purpose specified.

20. In a machine for making matches, a chain driving mechanism consisting of a driving shaft, a compound cam on the shaft, one working surface being higher than the other, a shaft supported by the frame, said latter shaft bearing a disk with projecting teeth of varying length that engage the compound cam, said latter shaft also bearing a pinion in mesh with a gear connected with sprocket wheels that have teeth in mesh with the teeth on the chain plates, whereby the chain is intermittently given a movement of varying distance as the teeth of varying length engage the higher or lower surfaces of the cam, substantially as specified.

21. In a machine for making matches in combination with the carrier chain, a rotary shaft having a disk with pins of different lengths projecting from its face, a rotary cam having on its periphery a cam rib, to pass between and engage the pins, and a cam face of greater pitch than that of the rib, made lower than the rib, so as to engage only a long pin on the pin disk, and suitable driving connections between the shaft and chain, substantially as and for the purpose specified.

22. In a machine for making matches, the mechanism for giving the splint carrier intermittent movements of different lengths, consisting of a rotary shaft carrying a disk provided with a series of pins, of which the one at one end of the series is higher than the others, a rotary cam having a cam rib high enough to engage all the pins, and a cam face, of greater pitch than such rib, made low enough to engage only the long pin, and suitable driving connections between the shaft and carrier, substantially as and for the purpose specified.

23. In mechanism for securing a step-by-step movement of the splint carrier of a match making machine, in combination with the rotary shaft and the disk thereon carrying the two series of pins, in which the pin at one end of each series is made longer than the others, and is separated from the short pin, at the adjoining end of the other series, by a space greater than that between the pins within one of the series, a rotary cam having a rib high enough to engage the lower pins, with one part inclined and one part in line with the travel of the rib, as the cam revolves, and a cam face lower than the rib, so as to engage only the higher pins, having an inclined portion of greater pitch than the incline of the rib, and a straight circumferential portion, parallel with the other part of the rib, substantially as and for the purpose specified.

24. In a machine for making matches, in combination with the composition vat and the rotary composition applying roller, and mixer turning therein, a rotary piece connected with the roller and mixer by suitable gearing, so as to rotate the same, two rotary wheels driven at different rates of speed, and pawl and ratchet connections between such rotary wheels and the rotary piece connected with the composition applying roller and mixer, whereby the latter devices will be driven by the wheel rotating at the greatest speed, while that is turning, and by the lower speed wheel when the other stops, substantially as and for the purpose specified.

25. In a machine for making matches, in combination with the composition applying mechanism and the moving devices thereof, a wheel, connections between the latter and the moving devices of the composition applying mechanism, the two pawls carried by the wheel, the two ratchet wheels, one for each pawl, and means for driving such ratchet wheels, at different speeds, in such direction, that their teeth, when they engage the pawls on the pawl carrying wheel, will cause such wheel to rotate, substantially as and for the purpose specified.

26. In a machine for making matches in combination with the composition vat, a mixer supported on a shaft in the vat, an applying roll supported on a shaft above the mixer such shafts bearing intermeshing gears and one of said shafts bearing a sprocket connected by a chain with a sprocket loosely mounted on its shaft, two pawls on opposite sides of such sprocket, the ratchet wheel turning with the shaft and engaged by one of the pawls, the ratchet wheel turning independent of the shaft and engaged by the other pawl on the sprocket wheel, means for rotating the shaft while the machine is in operation, and separate means for rotating the ratchet wheel independent of the shaft at a slower rate than the shaft rotates, whereby the mixer and composition roll, through one mechanism, are rotated rapidly when the machine is in motion, but more slowly through the other mechanism when the machine is stationary, substantially as and for the purpose described.

27. In a machine for making matches, in combination with the carrier holding the splints and a composition applying device, means for moving the carrier, a fan extending longitudinally over the carrier close to the headed splints therein, and means for swinging such fan transversely with reference to the carrier, substantially as and for the purpose specified.

28. In a machine for making matches, in combination with a splint cutting mechanism, a wax dipping mechananism, a composition applying mechanism, a series of drying rolls and a discharge mechanism, an endless chain for conveying the splints from mechanism to mechanism, a fan located adjacent to the path of movement of a portion of the chain and extending longitudinally over such path, and mechanism for moving the fan transversely with reference to the travel of the chain to dry the composition on the splints, substantially as specified.

29. In a machine for making matches, in combination with the frame, a runway for the endless chain supported by the frame between the drying rolls and the discharge mechanism, a rocking shaft held by the frame with arms supporting a plate or board extending longitudinally over the run-way, so as to form a fan adjacent to the runway, a crank for rocking the shaft, and driving mechanism for rotating the crank, substantially as specified.

30. In a machine for making matches, a discharge mechanism consisting of a reciprocating head having a recessed face, a slide inserted in said recess, punching pins projecting outward from said slide, a removable backing bar to receive the thrust of the pins and mechanism for reciprocating the head, substantially as specified.

31. In a machine for making matches, a discharge mechanism consisting of a reciprocating head, punching pins projecting outward from the front of said head and a removable backing bar to receive the thrust of the pins, substantially as specified.

32. In a machine for making matches, a discharge mechanism consisting of a reciprocating head having a recessed face, a slide inserted in said recess, punching pins projecting from said slide, an over-hanging plate for holding said slide in position, and removable clamps for securing the over-hanging plate, substantially as specified.

33. In a machine for making matches, in combination with a carrier for holding the match splints, while they are being treated, and a discharging mechanism to discharge the matches from the carrier, a moving conveyer receiving the discharged matches, and moving longitudinally with reference thereto, and means for moving such conveyer, to carry the matches discharged from the carrier at any one time, a distance greater than their length, before the next discharge of matches from the carrier takes place, substantially as and for the purpose specified.

34. In a machine for making matches, in combination with a carrier to hold the splints, while they are being treated, and a discharging mechanism to discharge from the carrier successively different portions of the quantity of completed matches held by the latter, a traveling receiving apron, to receive the discharged matches, moving longitudinally with reference thereto, and means for driving such apron at a speed sufficient to carry the matches discharged from the carrier at any one time beyond and out of the way of the matches next discharged upon the apron, substantially as and for the purpose specified.

35. In a machine for making matches, in combination with the carrier for holding the splints during treatment, adapted to hold such splints in rows, discharging mechanism operating, at intervals, to discharge, at one time, one or more of such rows, a traveling receiving apron, to receive the row or rows discharged from the carrier and moving longitudinally, with reference to the splints in such row or rows as discharged upon it, and means for moving the apron at a speed to carry the row or rows discharged upon it, at any one time, a distance greater than the length of a completed match, before the next discharge from the carrier is made by the discharging mechanism, substantially as and for the purpose specified.

36. In a machine for making matches, in combination with the carrier for holding the splints in rows, while they are being treated, the reciprocating discharger adapted to discharge the rows of matches successively from the carrier, the traveling receiving apron moving longitudinally with reference to the matches discharged upon it, and means for driving it, so that it moves, between the times of discharges by the discharging mechanism, a distance greater than the length of a match made from the splints, substantially as and for the purpose specified.

37. In a machine for making matches, in combination with a traveling carrier holding the treated splints in rows, and means for causing such rows to be successively discharged when they arrive at a given point, a traveling receiving apron, to receive the discharged rows, moving longitudinally with reference to the treated splints in such rows, and driving mechanism for the carrier and apron, relatively timed, so that, while the carrier is traveling the distance between two rows of the splints, the apron will be moved a distance greater than the length of one of such splints or matches, whereby the rows, as carried and delivered by the apron, will be separated from each other by clearly dividing spaces, substantially as and for the purpose specified.

38. In a machine for making matches in combination with a carrier plate provided with rows of splint receiving openings, the reciprocating discharger provided with means for discharging the contents from a row of holes at a time, means for actuating such discharger, a traveling receiving apron, in position to receive the rows of treated splints or matches, as they are successively discharged from the plate, moving longitudinally with reference to such splints or matches, and means for driving such apron and causing it to travel a distance greater than the length of a treated splint or match, while the discharger is moving to make two successive discharges from the plate, substantially as and for the purpose specified.

39. In a machine for making matches, in combination with the discharging mechanism, a traveling receiving apron supported by the frame adjacent to the discharge mechanism, moving longitudinally with reference to the matches received upon it and a rapidly revolving rod for insuring the passage of the discharged matches onto the apron between the discharge mechanism and the apron, substantially as specified.

EBENEZER B. BEECHER.
JACOB P. WRIGHT.

Witnesses:
H. R. WILLIAMS,
C. E. BUCKLAND.